United States Patent
Nomizu et al.

(10) Patent No.: US 7,409,060 B2
(45) Date of Patent: Aug. 5, 2008

(54) DURABLE AND UNDECIPHERABLE DIGITAL WATERMARKING TECHNIQUE AND DETECTION OF UNAUTHORIZED USE

(75) Inventors: Yasuyuki Nomizu, Kanagawa (JP); Hiroyuki Sakuyama, Tokyo (JP); Junichi Hara, Kanagawa (JP); Nekka Matsuura, Kanagawa (JP); Takanori Yano, Kanagawa (JP); Taku Kodama, Kanagawa (JP); Toshio Miyazawa, Kanagawa (JP); Yasuyuki Shinkai, Kanagawa (JP); Takayuki Nishimura, Tottori (JP)

(73) Assignee: Ricoh Company, Ltd., Tokyo (JP)

( * ) Notice: Subject to any disclaimer, the term of this patent is extended or adjusted under 35 U.S.C. 154(b) by 825 days.

(21) Appl. No.: 10/716,429

(22) Filed: Nov. 20, 2003

(65) Prior Publication Data
US 2004/0146160 A1    Jul. 29, 2004

(30) Foreign Application Priority Data
Nov. 21, 2002  (JP) .................... 2002-338118

(51) Int. Cl.
*H04N 7/167* (2006.01)
*H04L 9/00* (2006.01)
*G06K 9/00* (2006.01)
*B42D 15/00* (2006.01)

(52) U.S. Cl. .................. 380/200; 380/220; 382/100; 713/176; 283/113; 358/3.28

(58) Field of Classification Search ............ 283/113; 358/3.28; 713/176; 380/200, 220; 382/100
See application file for complete search history.

(56) References Cited

U.S. PATENT DOCUMENTS

| | | | | |
|---|---|---|---|---|
| 6,571,071 | B2 | 5/2003 | Kanoshima et al. | |
| 6,674,982 | B2 | 1/2004 | Saitoh et al. | |
| 6,879,703 | B2 * | 4/2005 | Lin et al. | 382/100 |
| 6,996,717 | B2 * | 2/2006 | Yin et al. | 713/176 |
| 7,046,817 | B2 * | 5/2006 | Kamijoh et al. | 382/100 |
| 7,095,873 | B2 * | 8/2006 | Venkatesan et al. | 382/100 |
| 2001/0050778 | A1 * | 12/2001 | Fukuda et al. | 358/1.9 |
| 2002/0159644 | A1 | 10/2002 | Sakuyama | |
| 2003/0095272 | A1 | 5/2003 | Nomizu | |
| 2003/0137695 | A1 | 7/2003 | Nomizu | |

OTHER PUBLICATIONS

U.S. Appl. No. 10/716,429, filed Nov. 20, 2003, Nomizu et al.

(Continued)

*Primary Examiner*—Nasser Moazzami
*Assistant Examiner*—Eleni Shiferaw
(74) *Attorney, Agent, or Firm*—Oblon, Spivak, McClelland, Maier & Neustadt, P.C.

(57) ABSTRACT

A digital watermarking technique is disclosed, in which image data are converted to frequency components through discrete wavelet transform and quantized into a set of quantized coefficients, which are then divided into a plurality of blocks. A digital watermark is embedded in the quantized coefficients by performing ON/OFF adjustment of bit information, such that the relation between natural number T and the bit information defined by N (N is an even number) significant bits Qnm (x, y) of the m-th bit plane of the n-th block satisfies the ON state represented by equation (1), or the OFF state represented by equation (2), depending on whether the hash value of the n-th block is odd or even. Then the quantized coefficients are encoded to produce a code stream.

20 Claims, 12 Drawing Sheets

OTHER PUBLICATIONS

U.S. Appl. No. 10/986,781, filed Nov. 15, 2004, Matsuura et al.
U.S. Appl. No. 10/390,193, filed Mar. 14, 2003, Sakuyama.
U.S. Appl. No. 10/390,263, filed Mar. 14, 2003, Kodama.
U.S. Appl. No. 10/372,479, filed Feb. 21, 2003, Unknown.
U.S. Appl. No. 10/348,444, filed Jan. 21, 2003, Nomizu.
U.S. Appl. No. 10/283,350, filed Oct. 30, 2002, Nomizu.
U.S. Appl. No. 10/082,308, filed Feb. 26, 2002, Sakuyama.
U.S. Appl. No. 09/847,192, filed May 2, 2001, Fukuda et al.
U.S. Appl. No. 09/725,569, filed Nov. 30, 2000, Namizuka et al.
U.S. Appl. No. 09/748,240, filed Dec. 27, 2000, Yoshizawa et al.
U.S. Appl. No. 09/748,262, filed Dec. 27, 2000, Namizuka et al.
U.S. Appl. No. 09/770,214, filed Jan. 29, 2001, Oteki et al.
U.S. Appl. No. 09/772,945, filed Jan. 31, 2001, Oteki et al.
U.S. Appl. No. 09/846,244, filed May 2, 2001, Shoji et al.
U.S. Appl. No. 09/855,665, filed May 16, 2001, Yamagata et al.
U.S. Appl. No. 09/912,364, filed Jul. 26, 2001, Sakuyama.
U.S. Appl. No. 09/940,589, filed Aug. 29, 2001, Inoue et al.
U.S. Appl. No. 09/964,584, filed Sep. 28, 2001, Shinkai et al.
U.S. Appl. No. 10/102,633, filed Mar. 22, 2002, Ameyama et al.
U.S. Appl. No. 10/156,093, filed May 29, 2002, Sano et al.
U.S. Appl. No. 10/164,545, filed Jun. 10, 2002, Sano et al.
U.S. Appl. No. 10/272,857, filed Oct. 18, 2002, Watanabe et al.
U.S. Appl. No. 10/379,533, filed Mar. 6, 2003, Takeyama et al.
Nippon Denshi Kogyo Shinko Kyokai (Japanese Electronic Industry Development Association), pp. 1-99, "Investigative Report of Digital Watermark Technology", Mar. 1999.

* cited by examiner

Decomposition_Level_0

Decomposition_Level_1

Decomposition_Level_2

Decomposition_Level_3

FIG.5B non-overlapping adjacent blocks overlapping adjacent blocks

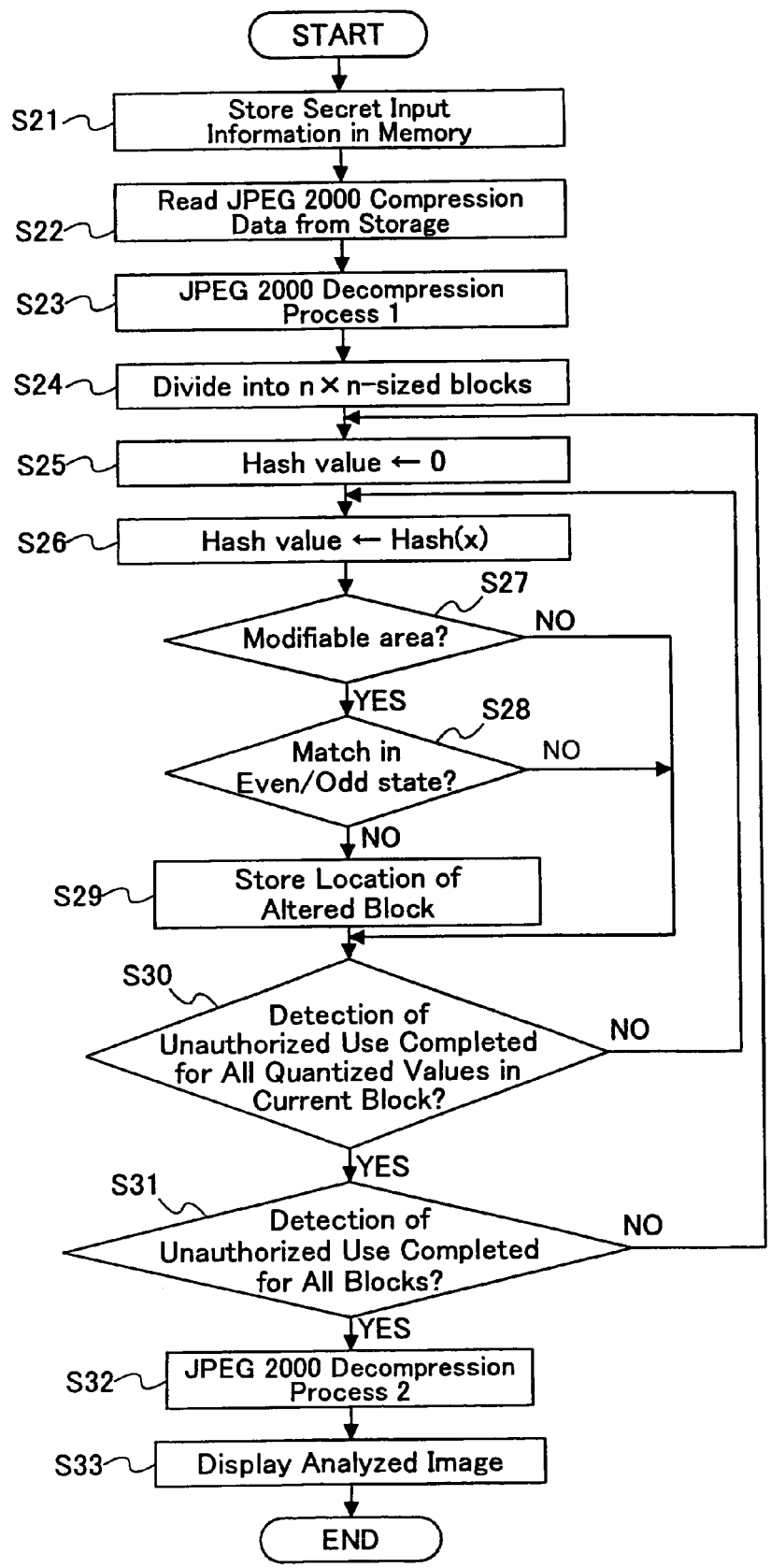

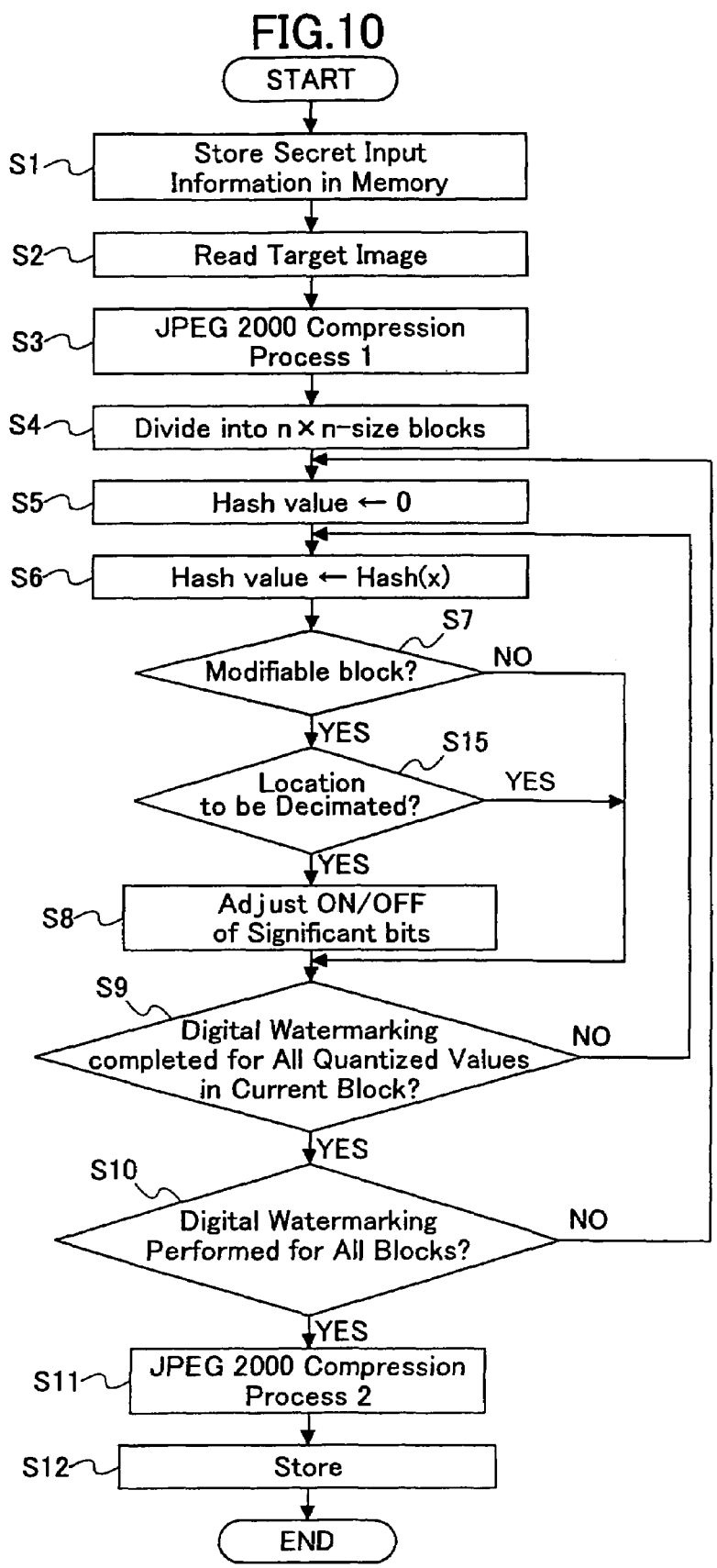

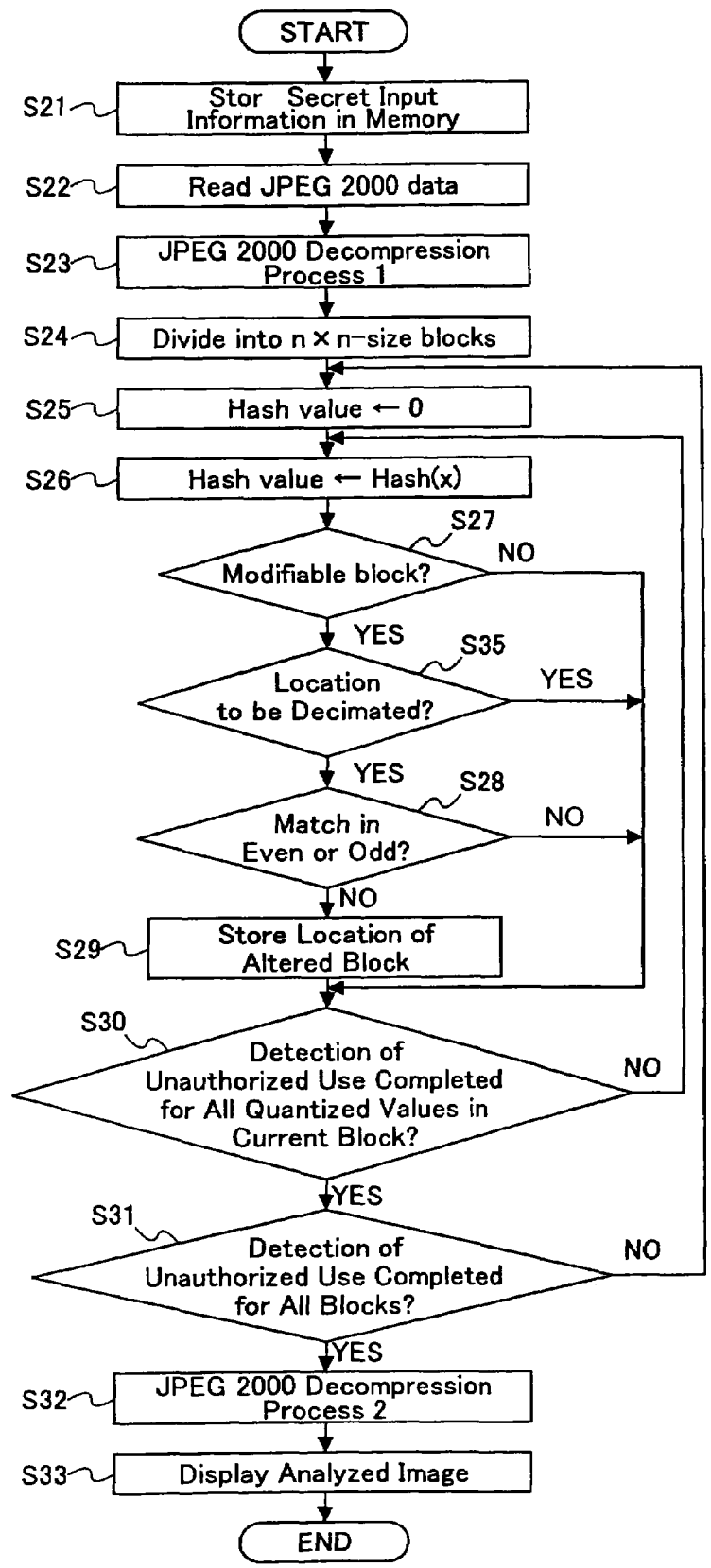

DURABLE AND UNDECIPHERABLE DIGITAL WATERMARKING TECHNIQUE AND DETECTION OF UNAUTHORIZED USE

BACKGROUND OF THE INVENTION

1. Field of the Invention

The present invention relates to an improved technique for embedding a digital watermark in digital contents information during an encoding process, which watermark is durable against degradation and more undecipherable to a third party, and a technique for detecting unauthorized use during the decoding process using the digital watermark embedded in the compressed code stream.

2. Description of Related Art

Digital information (or digital contents), such as digital images, can be copied easily by computers, without degrading the information. In recent years and continuing, along with the progress in digital image technologies, digital photographs taken by a digital camera are likely to be used as evidence. There is some digital information protected by copyright, and unauthorized copy or reuse of the copyrighted digital contents is prohibited.

In general, digital contents are easy to copy, and easy to tamper with by rewriting or overwriting the contents through simple modification processes. For this reason, digital contents are often copied dishonestly, and the copied contents are willfully misappropriated, destroyed, or tampered with.

To overcome this problem, a technique called digital watermarking or data hiding has been proposed, which is used to prevent unauthorized copying by embedding information into digital contents (such as digital images). The embedded information is invisible when the digital contents are reproduced in an ordinary manner. By checking the digital watermark embedded in the digital contents, it can be determined whether the digital contents have been used dishonestly.

A digital watermark embedded in digital contents has several uses, such as

A. Recording copyright information,
B. Tracking information about illegal copying,
C. Providing a past record of IP addresses,
D. Preventing illegal copying (invisible and high-durability type),
E. Application to anti-tampering (invisible and low-durability type),
F. Authentication,
G. Secure (encrypted) communications,
H. Embedding notes or labels of digital contents for indicating the owner (either visible or invisible type), and
I. Enabling removal of the watermark (visible or invisible type for distributing contents).

Among these, systems for preventing illegal copying (above-described item D) have been proposed for the purpose of protecting the copyright of a creator of digital contents.

For example, it is proposed, when selling or distributing digital contents regarding copyright related information, such as information about the copyright owner and the purchaser himself/herself in the digital contents, to let the contents provider of the digital contents inform the purchaser about the digital watermark representing the copyright related information in order to allow the purchaser to know about the copyright. This system aims to psychologically inhibit a person with common sense from making improper use of the digital contents. Although a malicious user may ignore the copyright and make an unauthorized use, it is possible for the copyright owner to identify the malicious user and assert the copyright by acquiring the illegally used digital contents and extracting the digital watermark from the acquired digital contents. See "Technical Report about Digital Watermarking", March, 1999, Nippon Denshi Kogyo Shinko Kyokai. The original source is "Prevention of Illegal Copying of Electronic Information", Nikkei Business, Feb. 23, 1998, at 68-70 (1998).

Techniques for embedding digital watermarks in digital contents (hereinafter, referred to as "digital watermarking") are grouped into (1) embedding a digital watermark directly in sampling values of the contents data, and (2) embedding a watermark in frequency components.

With the former technique (for embedding a watermark directly into sampling values), the process workload for processing and compressing the digital contents is not so heavy. However, when performing digital processing and compression of the digital contents in which a watermark is embedded, the digital watermark is likely to be lost.

On the other hand, the latter technique (for embedding a watermark in frequency components) requires heavy processing for embedding and extracting the digital watermark into and from the digital contents. However, it is durable against digital processing and compression.

Meanwhile, for monochromatic digital photocopy, facsimile, and monochrome print of a newspaper, lossless image compression using black-and-white bi-level images and capable of restoring the original image without loss is recommended and widely used. As lossless image compression schemes, MH/MR/MMR under G3/G4 standards of the International Telecommunications Union Telecommunication Standardization Sector (ITU-T) are known.

However, these schemes are inferior in coding efficiency for intermediate processed images or error-diffusion processed images, and accordingly, image compression may not be correctly performed.

To overcome this problem, a method called arithmetic coding, which a type of entropy coding, is attracting attention. For instance, JBIG, which is a group for investigating a new international standard for a coding scheme of bi-level images, employs arithmetic coding called QM-coder, which is recommended as an ITU-T standard.

In contrast, those products that handle multi-level images including digital color images or gray-scale images (e.g., digital still cameras and digital video cameras) often employ lossy compression. Lossy compression is a technique that gives priority to the compression effect when storing data, while making a sacrifice of slight degradation of image quality due to loss of detailed information of the original image. Examples of the lossy compression technique include JPEG and MPEG, which are based on signal-to-frequency conversion using discrete cosine transform (DCT).

As the post-JPEG standard, JEPG 2000 is attracting a great deal of attraction as the coding standard unifying lossless and lossy coding schemes, as well as unifying bi-level data and multi-level data. JPEG 2000 employs discrete wavelet transform (DWT) for converting a signal into elementary frequency components to reduce image degradation during high-rate compression. In addition, MQ-coder is used to achieve high-rate compression. MQ-coder is an arithmetic coding scheme similar to the above-described QM coder, and is approved by JBIG.

The above-described former (first-listed) digital watermarking technique (i.e., watermarking directly in the sampling values of the digital contents) is unsuitable for digital contents of multi-level images to be subjected to compression, because the image quality is degraded due to encoding and compression of images performed when storing the digital contents. Due to the degradation of the images, the digital watermark embedded in the digital contents is also degraded.

As compression encoding and decompression decoding are repeated, the distinguishability of the digital watermark embedded in digital contents weakens. In the worst case, it becomes difficult to detect unauthorized use of the digital contents in spite of the fact that the digital watermark is embedded in the contents.

To this end, it is preferable to employ the above-described latter technique for embedding a watermark in the frequency component (or the code stream prepared for compression) when the digital watermark is used for the purpose of preventing unauthorized use of digital contents, so that the digital watermark can be correctly detected even after encoding and decoding processes are repeated.

SUMMARY OF THE INVENTION

Therefore, it is an object of the present invention to provide an improved technique for protecting digital contents from unauthorized use even after compression encoding and decompression decoding are repeated, by furnishing a reliable digital watermark in the digital contents.

To achieve the object, in one aspect of the invention, a code stream producing apparatus is provided. The apparatus comprises:

(a) a quantizer that quantizes a frequency component obtained from a pixel value of an image through discrete wavelet transform to produce a set of quantized coefficients for each tile of the image;

(b) a block processing unit that divides the set of quantized coefficients into a plurality of blocks;

(c) a hash conversion unit that carries out hash conversion for each of the blocks, based on the quantized coefficients of the block, to obtain an encoding hash value for the block;

(d) a bit plane defining unit that divides each of the blocks into bit planes;

(e) a digital watermarking unit that adjusts the ON/OFF state of significant bits such that the relation between information defined by N (N is an even number) significant bits Qnm(x, y) (x=0, 1, ..., y=0, 1, ...) of the $m^{th}$ bit plane of the $n^{th}$ block BL and a natural number T satisfies either the ON state expressed by equation (1), or the OFF state expressed by equation (2), depending on whether a coding hash value of the $n^{th}$ block is odd or even, in order to embed a digital watermark; and (f) an encoding unit that encodes the set of quantized coefficients containing the ON/OFF adjusted significant bits.

$$\left| \sum_{k=1}^{\frac{1}{2}N} Qnm(ik, jk) \right| - \left| \sum_{k=\frac{1}{2}N+1}^{N} Qnm(ik, jk) \right| > T \quad (1)$$

$$\left| \sum_{k=\frac{1}{2}N+1}^{N} Qnm(ik, jk) \right| - \left| \sum_{k=1}^{\frac{1}{2}N} Qnm(ik, jk) \right| > T \quad (2)$$

When encoding a sequence of bits representing a quantized coefficient from a higher bit to a lower bit, a state in which it is known that the current bit is a non-zero bit is referred to the "significant" state, and the bit in the significant state is referred to as a "significant bit". The significant bit is an already encoded bit with a value of "1".

By embedding a digital watermark in the quantized coefficients, degradation of the digital watermark can be prevented even after encoding and decoding of image data are repeated several times. Because ON/OFF adjustment is performed on the significant bits of each single bit plane, the digital watermark embedded through the ON/OFF adjustment can be maintained, without disappearing, even if one or more bit planes are discarded during the encoding process. In addition, since the encoding hash value used in the ON/OFF adjustment of the significant bit is obtained block by block, unauthorized use of digital contents can be detected for each block.

In the second aspect of the invention, a code stream producing apparatus comprises:

(a) a quantizer that quantizes a frequency component obtained from a pixel value of an image through discrete wavelet transform to produce a set of quantized coefficients for each tile of the image;

(b) a block processing unit that divides the set of quantized coefficients into a plurality of blocks;

(c) a hash conversion unit that carries out hash conversion for each of the blocks, based on the quantized coefficients of the block to obtain an encoding hash value for the block;

(d) a bit plane defining unit that divides each of the blocks into bit planes;

(e) a digital watermarking unit that adjusts the ON/OFF state of significant bits such that the relation between information defined by N (N is an even number) significant bits $Qnm_j(x, y)$ (x=0, 1, ..., y=0, 1, ...) of the $m_j$-th bit plane of the $n^{th}$ block and a natural number T satisfies either the ON state expressed by equation (3), or the OFF state expressed by equation (4), depending on whether the encoding hash value of the $n^{th}$ block is odd or even, in order to embed a digital watermark; and (f) an encoding unit that encodes the set of quantized coefficients containing the ON/OFF adjusted significant bits.

$$\left| \sum_{k=1}^{\frac{1}{2}N} Qnm_k(ik, jk) \right| - \left| \sum_{k=\frac{1}{2}N+1}^{N} Qnm_k(ik, jk) \right| > T \quad (3)$$

$$\left| \sum_{k=\frac{1}{2}N+1}^{N} Qnm_k(ik, jk) \right| - \left| \sum_{k=1}^{\frac{1}{2}N} Qnm_k(ik, jk) \right| > T \quad (4)$$

Since the encoding hash value used in the ON/OFF adjustment of the significant bits is acquired block by block, unauthorized use can be detected block by block when the compressed image data are decoded. The significant bits to be subjected to the ON/OFF adjustment are dispersed across a plurality of bit planes, and therefore, image degradation due to digital watermarking can be prevented more efficiently. In addition, the resolution of the target region for detecting unauthorized use can be improved.

In the third aspect of the invention, a code stream producing apparatus comprises:

(a) a quantizer that quantizes a frequency component obtained from pixel values of an image through discrete wavelet transform to produce a set of quantized coefficients for each tile of the image;

(b) a block processing unit that divides the set of quantized coefficients into a plurality of blocks;

(c) a hash conversion unit that carries out hash conversion for each of the blocks, based on the quantized coefficients of the block, to obtain an encoding hash value for the block;

(d) a bit plane defining unit that divides each of the blocks into bit planes;

(e) a digital watermarking unit that adjusts the ON/OFF state of significant bits such that the relation between information defined by N (N is an even number) significant bits $Qn_i m_j(x, y)$ (x=0, 1, ..., y=0, 1, ...) of the $m_j$-th bit plane of the $n_i$-th block and a natural number T satisfies either the ON state expressed by equation (5), or the OFF state expressed by equation (6), depending on whether the encoding hash value of the $n_i$-th block is odd or even, in order to embed a digital watermark; and (f) an encoding unit that encodes the set of quantized coefficients containing the ON/OFF adjusted significant bits.

$$\left| \sum_{k=1}^{\frac{1}{2}N} Qn_k m_k(ik, jk) \right| - \left| \sum_{k=\frac{1}{2}N+1}^{N} Qn_k m_k(ik, jk) \right| > T \quad (5)$$

$$\left| \sum_{k=\frac{1}{2}N+1}^{N} Qn_k m_k(ik, jk) \right| - \left| \sum_{k=1}^{\frac{1}{2}N} Qn_k m_k(ik, jk) \right| > T \quad (6)$$

Since the significant bits to be subjected to the ON/OFF adjustment are dispersed across a plurality of bit planes of a plurality of blocks, image degradation due to digital watermarking can be prevented more efficiently. In addition, the resolution of the target region for detecting unauthorized use can be improved.

The digital watermarking unit carries out the ON/OFF adjustment of the significant bit in either a first mode, in which the relation between natural number T and bit information defined by significant bits is adjusted to the ON state when the hash value is odd and to the OFF state when the hash value is even, or a second mode, in which the relation between natural number T and bit information defined by significant bits is adjusted to the ON state when the hash value is even and to the OFF state when the hash value is odd.

By selectively using the first or second mode, the digital watermark embedded in the digital contents can be made more undecipherable to a third party.

The first or the second modes may be set in a switchable manner. In this case, the ON/OFF state of significant bit information is determined according to the selected mode.

The first or the second mode is selected based on the encoding hash value and the coordinate value of the currently processed quantized coefficient on the image. Alternatively, the first or the second mode may be set based on the encoding hash value and externally input secret information. These arrangements also make the digital watermark more undecipherable to a third party.

Encoding is performed from a higher bit plane to a lower bit planer. When turning an OFF bit into the ON state, all the associated bits in bit planes lower than the current bit plane are made OFF. When turning an ON bit into the OFF state, all the associated bits in the bit planes lower than the current bit plane are made ON.

Accordingly, ON/OFF adjustment of the significant bits can be performed uniformly during the encoding process from the higher bit plane to the lower bit plane. This arrangement can reduce image degradation due to digital watermarking through ON/OFF adjustment of the significant bits.

The code stream producing apparatus further comprises quantized coefficient selecting means that acquires quantized coefficients in a selective manner, and in this case, the digital watermarking unit performs the ON/OFF adjustment of the siginificant bits for the selectively acquired quantized coefficients.

This arrangement can reduce image degradation due to digital watermarking, as compared with the case in which all the quantized coefficients are subjected to the ON/OFF adjustment of the significant bits.

The quantized coefficient selecting unit selects those quantized coefficients that have a difference from the adjacent quantized coefficients equal to or greater than a prescribed threshold value.

By performing ON/OFF adjustment to those quantized coefficients having a difference from the adjacent coefficients equal to or greater than the threshold value (that is, having a steep change with respect the adjacent coefficients), image degradation due to digital watermarking can be reduced efficiently.

This threshold value may be embedded in the quantized coefficients. In this case, the quantized coefficients in which the digital watermark and the threshold value are embedded are encoded.

The hash conversion may be carried out using at least one of externally input secret information, date information, and a manufacturing number of the code stream producing apparatus, in addition to the quantized coefficients.

This arrangement can make the digital watermark more undecipherable to a third party.

In the fourth aspect of the invention, an image processing apparatus that receives and decodes a code stream produced by the code stream producing apparatus of any one of the first through third aspects of the invention is provided. The image processing apparatus comprises (a) a decoding unit that decodes the code stream to produce a set of quantized coefficients;

(b) a block processing unit that divides the set of quantized coefficients into a plurality of blocks;

(c) a decoding hash conversion unit that carries out hash conversion for each of the blocks, based on the quantized coefficients of the block, to obtain a decoding hash value for the block;

(d) a bit plane defining unit that divides the quantized coefficients of each of the blocks into bit planes; and (e) an unauthorized use detecting unit that determines whether an odd/even property represented by either an ON state, in which a relation between a natural number T and bit information defined by N (N is an even number) significant bits $Qn_i m_j (x, y)$ (x=0, 1, ..., y=0, 1, ...) of the $m_j$-th bit plane of the $n_i$-th block satisfies equation (7), or an OFF state, in which the relation between the natural number T and the bit information satisfies equation (8), matches an odd or even value of the decoding hash value of the $n_i$-th block.

$$\left| \sum_{k=1}^{\frac{1}{2}N} Qn_k m_k(ik, jk) \right| > \left| \sum_{k=\frac{1}{2}N+1}^{N} Qn_k m_k(ik, jk) \right| \quad (7)$$

$$\left| \sum_{k=1}^{\frac{1}{2}N} Qn_k m_k(ik, jk) \right| < \left| \sum_{k=\frac{1}{2}N+1}^{N} Qn_k m_k(ik, jk) \right| \quad (8)$$

This image processing apparatus can detect unauthorized use when decoding the compressed image by determining the presence or the absence of a match between the odd/even property of the decoded bit information and the odd/even property of the decoding hash value of the associated block.

The image processing apparatus further comprises a display unit that emphasizes the block in which unauthorized use has been detected through the matching operation when displaying the decoded image.

With this arrangement, the user can visually recognize occurrence of unauthorized use of the image data.

BRIEF DESCRIPTION OF THE DRAWINGS

Other objects, features, and advantages of the present invention will become more apparent from the following detailed description when read in conjunction with the accompanying drawings, in which:

FIG. 9 is a flowchart showing the operation carried out by the image processing apparatus to detect unauthorized use or tampering with code stream data in which digital watermark is embedded;

FIG. 10 is a flowchart showing the operation carried out by the image processing apparatus to embed a watermark according to the fourth embodiment of the invention; and FIG. 11 is a flowchart showing the operation carried out by the image processing apparatus to detect unauthorized use or tampering with code stream data in which digital watermark is embedded.

DETAILED DESCRIPTION OF THE INVENTION

The preferred embodiments of the present invention are next described with reference to the attached drawings. First, explanation is made of the outline of the JPEG 2000 algorithm, which is set forth as a premise of the present invention.

Figure 1:
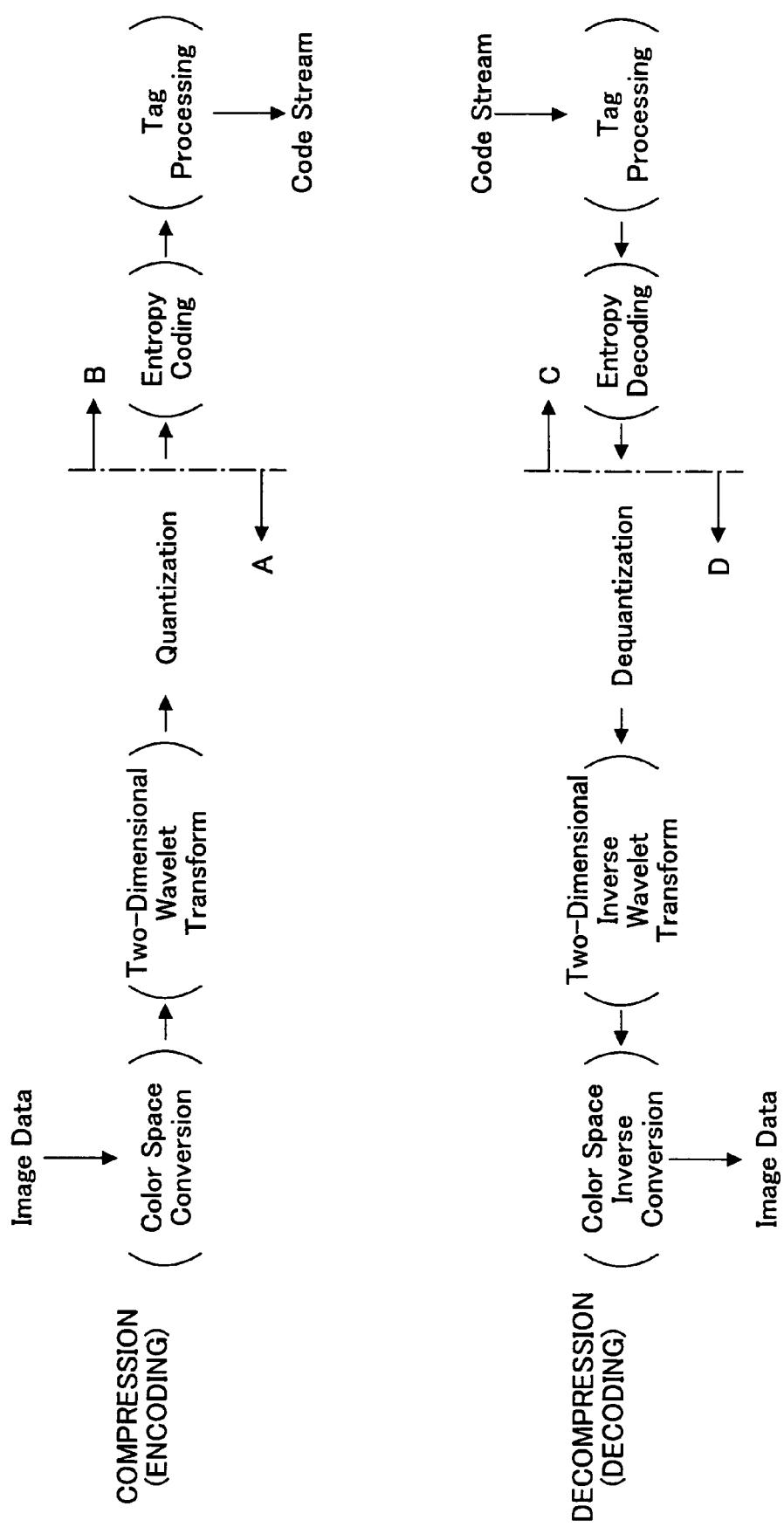
FIG. 1 is a diagram showing the hierarchical coding algorithm that is the basis of the JPEG 2000 format.

FIG. 1 illustrates a hierarchical coding algorithm, which is the basis of the JPEG 2000 scheme. Using the JEPG 2000 hierarchical coding algorithm (hereinafter, simply referred to as the JPEG 2000 algorithm), digital image data are compressed to produce code streams (encoding) and the original image data are recovered through decompression of the code stream (decoding).

One of the distinctive points of the JPEG 2000 algorithm over the conventional JPEG algorithm is a signal-to-frequency conversion method. The conventional JPEG algorithm employs discrete cosine transform (DCT), while the JEPG 2000 hierarchical coding algorithm uses discrete wavelet transform (DWT). Discrete Wavelet Transform (DWT) has an advantage in that the image quality is good in high compression (low bit-rate) domains, as compared with DCT. This is exactly the reason why the JPEG 2000 algorithm employs DWT.

In addition, a big difference between the JPEG 2000 algorithm and the conventional JPEG algorithm is that in JEPG 2000 compression data are created as a code stream through the image compression process in order to output code streams at the last stage of the system. For the decompression process, the code streams required for decompression are interpreted. Therefore, a function for creating code streams and a function for interpreting the code streams are furnished in the JPEG 2000 algorithm.

JPEG 2000 is designed so as to realize various convenient functions using code streams. For example, compression and decompression operations of a still image can be stopped freely at an arbitrary decomposition level corresponding to the octave band decomposition in block-based DWT (which will be described below with reference to FIG. 3). Furthermore, JPEG 2000 allows a low resolution picture (a reduced picture) to be taken out from a file, as well as a portion of a picture (a tiling image) to be extracted from the file.

For the image data of the original image input to or output from the system, color space conversion from the RGB color system consisting of the primary color components R (red), G (green), and B (blue) to YUV and vice versa are carried out. Alternatively, color space conversion from the YMC color system consisting of complementary color components Y (yellow), M (magenta), and C (cyan) to YCbCr and vice versa are carried out.

Figure 2:
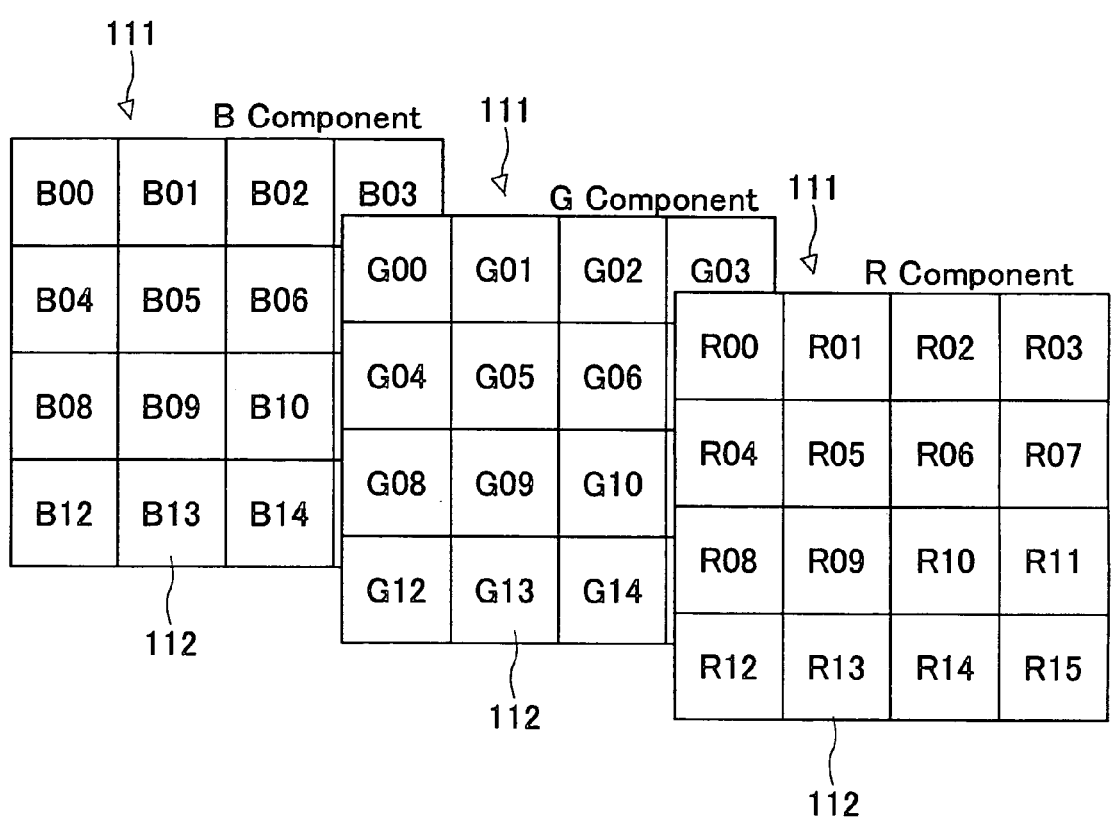
FIG. 2 illustrates that an original image is separated into color components and is divided into multiple rectangular sections (tiles) for each of the color components.

In general, the original color image is separated into the respective color components, and each color component is divided into multiple rectangular regions 112, as illustrated in FIG. 2. This rectangular region is called a block or a tile. Since it is common in JEPG 2000 to call the divided region a "tile", this rectangular region is hereinafter referred to as a "tile" 112.

When the compression and decompression processes are executed on image data with the JPEG 2000 algorithm, each tile 112 becomes a basic unit, and compression and decompression of the image data are carried out independently for each color component 111 and each tile 112.

First, encoding of image data in the JPEG 2000 algorithm is explained. In encoding image data using the JPEG 2000 algorithm, color space conversion is performed on the data contained in each tile 112 of each color component 111, as shown in FIG. 1. Then, two-dimensional wavelet transform (forward transform) is carried out to spread the signal into frequency domains, and the tile is spatially split for each frequency subband.

Figure 3:
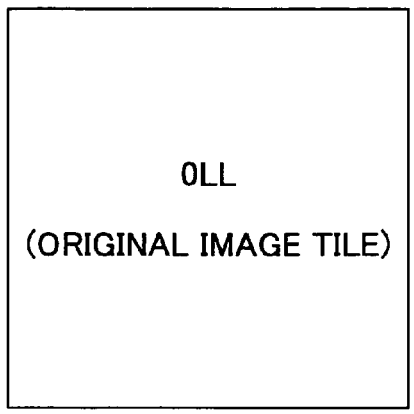
FIG. 3 illustrates the subband structure in each of the decomposition levels when 3-level decomposition is employed.
Figure 3:
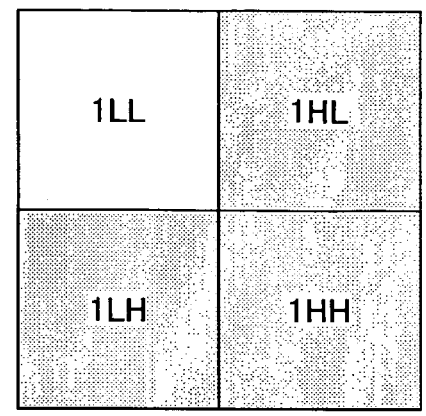
Figure 3:
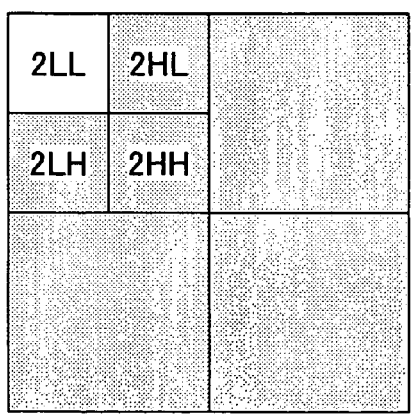
Figure 3:
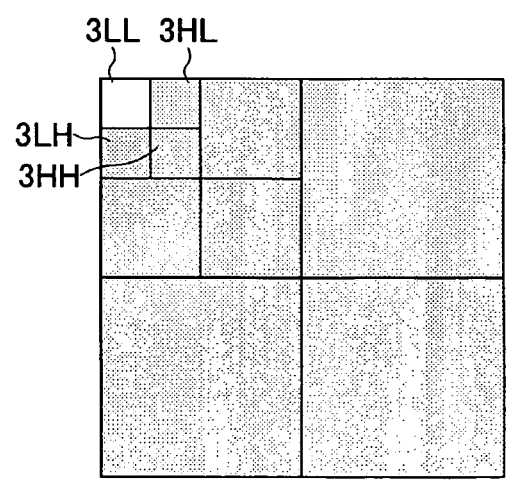

FIG. 3 illustrates the subband structure of each decomposition level when level 3 decomposition is employed. With level 3 decomposition (which means that the number of wavelet transform operations performed on the data is three), a tile of the original image created through the tiling process of the original image is at decomposition level 0 (referred to as 0LL subband). The tile of the original image is subjected to two-dimensional wavelet transform, and the frequency component is separated into subbands (1LL, 1HL, 1LH, and 1HH) of decomposition level 1. Then, another two-dimensional wavelet transform is performed on the lowest subband 1LL of decomposition level 1 to separate 1LL subband into decomposition level 2 subbands (2LL, 2HL, 2LH, and 2HH). Similarly, two-dimensional wavelet transform is again performed on the lowest frequency component 2LL to separate the 2LL subband into decomposition level 3 subbands (3LL, 3HL, 3LH, and 3HH). In FIG. 3, the subbands which are to be subjected to encoding at each decomposition level are indicated with gray scale. For instance, with level 3 decomposition, the subbands 3HL, 3LH, 3HH, 2HL, 2LH, 2HH, 1HL, 1LH, and 1HH are to be encoded, while 3LL subband data are not to be encoded.

Figure 4:
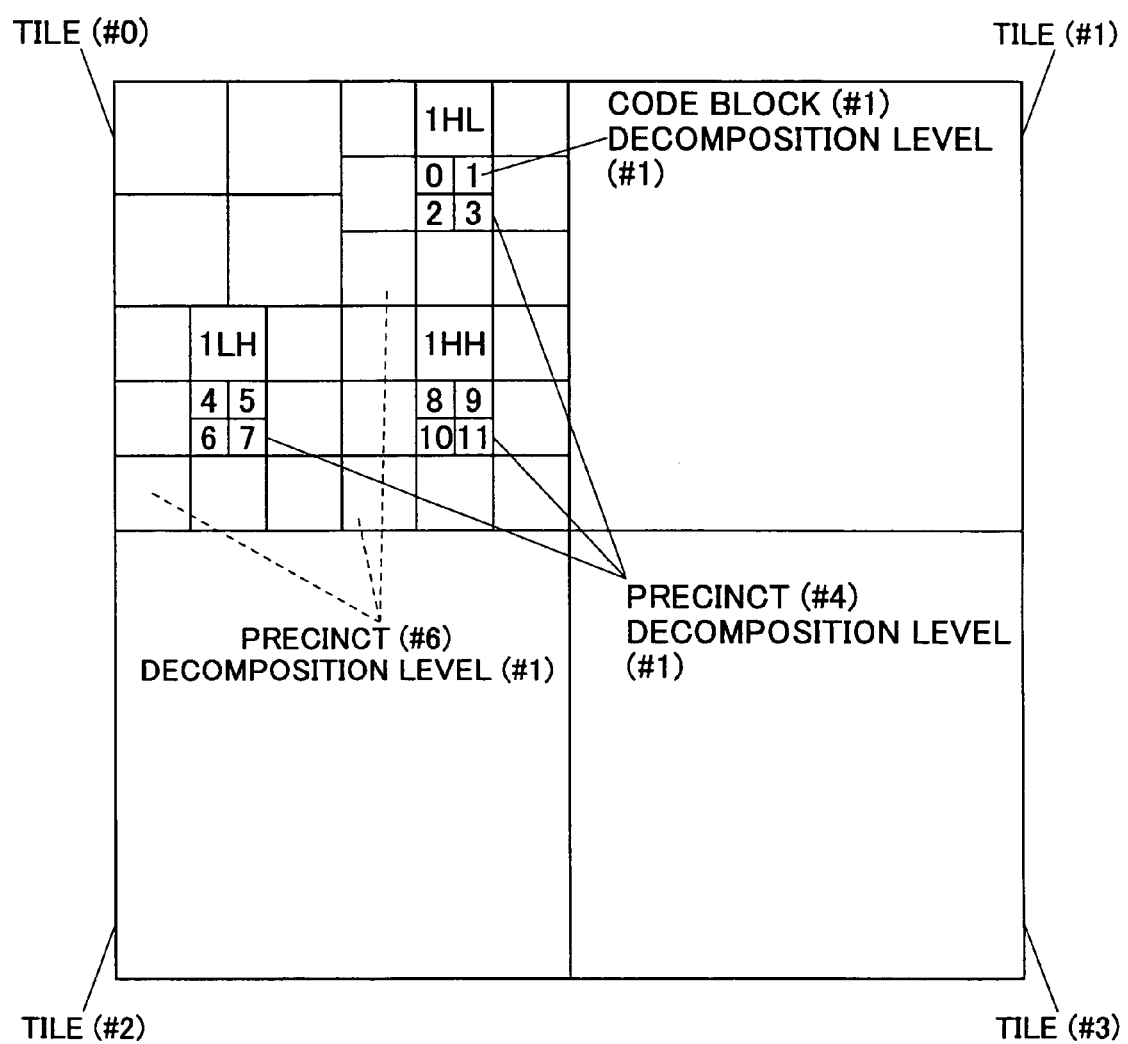
FIG. 4 is a diagram showing each of the subbands at decomposition level 1 divided into precincts.

Then, bits to be encoded are determined successively accordingly to the designated encoding order, and contexts are created from the peripheral bits around the target bit (in the quantization process). The set of the wavelet coefficients produced through quantization are then split into non-overlapping rectangular blocks called "precincts" for each of the subbands. This technique is introduced for the purpose of using computer memory efficiently during implementation. As illustrated in FIG. 4, a precinct consists of three sets of rectangular regions spatially in agreement with each other.

Each of the precincts is further divided into non-overlapping rectangular subregions called "code blocks". A code block is a basic unit for entropy encoding.

The coefficient values after wavelet transform may be directly quantized and encoded as they are. However, with JPEG 2000, the coefficient values are decomposed into bit planes, and the bit planes may be ordered in each precinct or each code block, for the purpose of increasing the encoding efficiency.

Figure 5A:
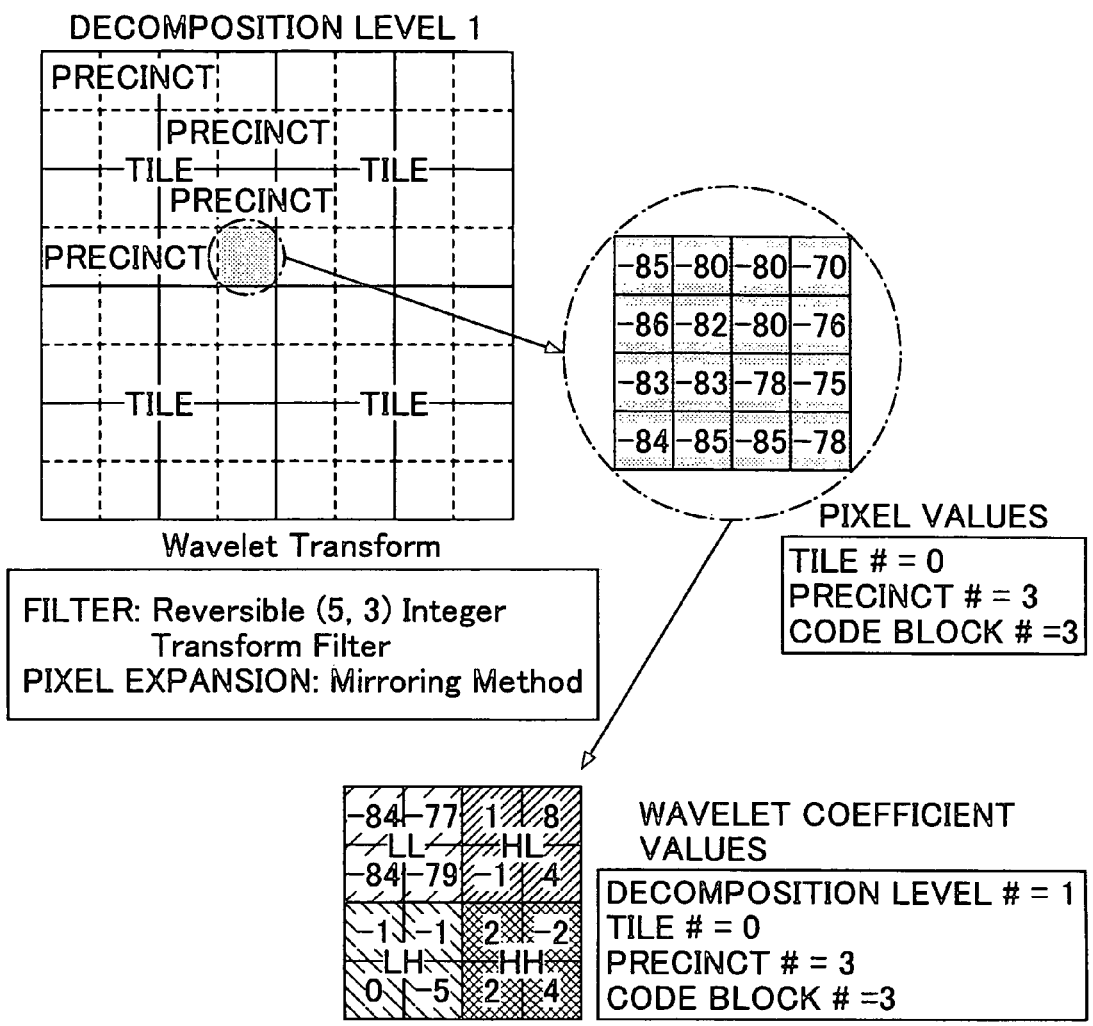
FIG. 5 is an example of a procedure for ordering bit planes of each subband.
Figure 5B:
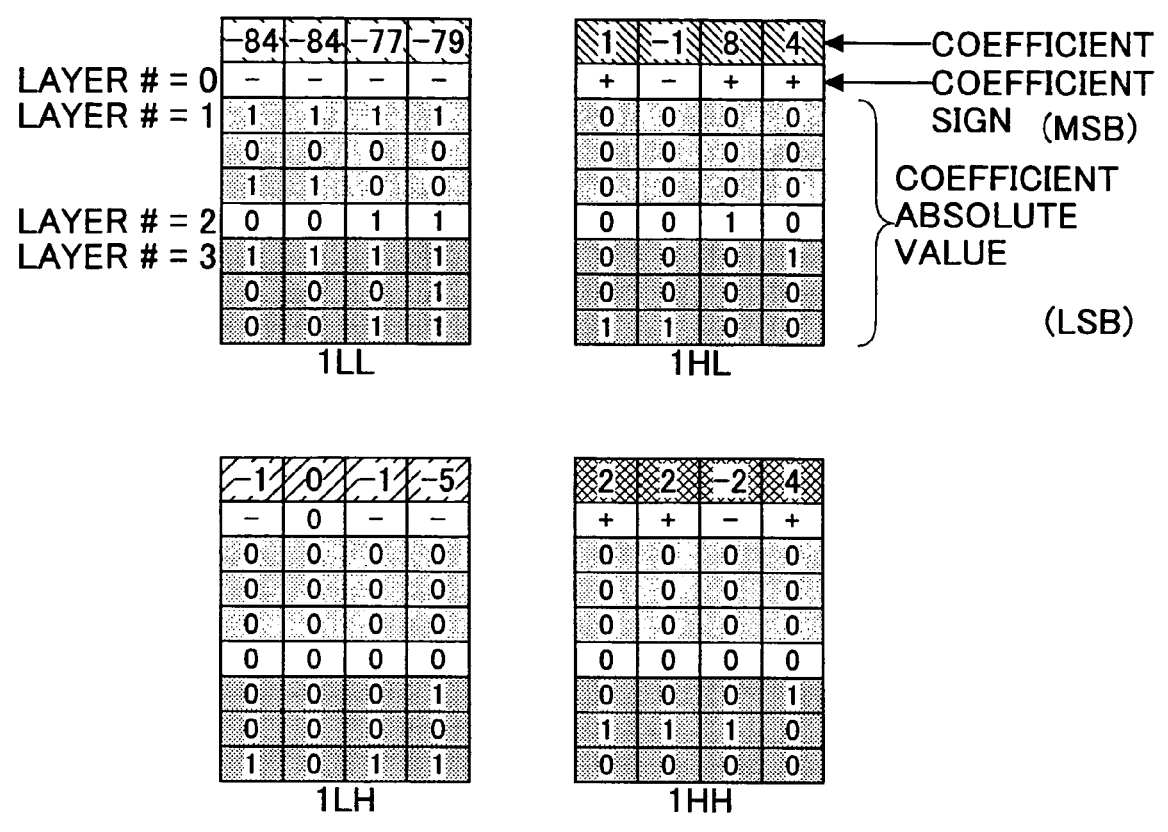

FIG. 5A and FIG. 5B illustrate ordering of the bit planes. In this example, the original image (32*32 pixels) is divided into four 16*16-pixel tiles. The sizes of the precincts and the code blocks at decomposition level 1 are set to 8*8 pixels and 4*4 pixels, respectively. The precincts and the code blocks are numbered according to the raster direction. In this example, a tile includes precincts 0-3, and each precinct includes code blocks 0-3. A mirroring method is used for pixel expansion toward the outside of the tile border. Discrete wavelet transform is performed using a reversible (5,3) filter, and an array of wavelet coefficients of decomposition level 1 is obtained.

In FIG. 5A, pixel values of code block 3 of precinct 3 of tile 0 are shown in the circle. This code block after wavelet transform is split into subbands (1LL, 1HL, 1LH, and 1HH), and wavelet coefficient values are assigned to each of the subbands.

FIG. 5B illustrates the concept of the typical "layer" structure. The layer structure is easy to understand when viewing the wavelet coefficients from the lateral (bit plane) configuration. Each layer consists of an arbitrary number of bit planes. In the example shown in FIG. 5B, each of layer 0 and layer 2 consists of a single bit plane, while each of layer 1 and layer 3 consists of three bit planes. If a layer contains a bit plane closer to LSB (least significant bit), then the layer is quantized earlier. To the contrary, a layer that contains a bit plane closer to MSB (most significant bit) is maintained to the end without being subjected to quantization. The technique of discarding from those layers closer to LSB is called truncation, and is capable of controlling the quantization rate at fine levels.

Then, based on probability estimation from the contexts and the target bits, each tile of a color component is encoded. The encoding operation is performed for each tile until all the color components of the original image are encoded.

Finally, the code streams of the original image are combined into an output code stream, and a tag is added to the output code stream.

Next, decoding of compressed image data with the JPEG 2000 algorithm is explained. In decoding the code stream, a process reverse to the encoding process is carried out to generate image data from the code stream of each tile of each color component. In the decoding process, tag information added to the code stream externally input to a decoding apparatus is interpreted, and the code stream is disassembled into multiple code streams so that each of the code streams corresponds to one of the tiles of one of the color components. The code stream is decoded and decompressed for each tile of each component. The location of a bit to be decoded is defined according to the order based on the tag information attached to the input code stream, and a context is generated from the row of the peripheral bits (having already been subjected to decoding) of the target bit. Then, the target bit is decoded based on probability estimation from the context and the code stream. The estimated value is written in the location of the target bit.

Since the decoded data are spatially divided at each frequency subband, two-dimensional wavelet transform (reverse transform) is carried out on the decoded data to restore each of the tiles 112 of each color component 111. The restored data are subjected to reverse color space conversion to generate the image data of the original color system.

The foregoing is the outline of the JPEG 2000 algorithm.

In encoding the image data, either a reversible or irreversible conversion process can be performed up to the quantization of the wavelet coefficients resulting from discrete wavelet transform of the input image data. The subsequent process, that is, the process for producing a code stream through entropy coding from the wavelet coefficients have been subjected to quantization, is a reversible conversion process. In decoding the code stream of image data, a reversible process is performed up to decoding the wavelet coefficients (or quantized coefficients because quantization is not performed in reversible compression) from the code stream input and stored in the compressed format. The subsequent process, that is, the process for producing image data from the decoded wavelet coefficients, is either a reversible or an irreversible conversion process.

Next, the first embodiment of the invention is described below with reference to FIG. 6 through FIG. 10. In the present invention, quantized transform coefficients produced by the JPEG 2000 algorithm are used for digital watermarking. A digital watermark is embedded in the qunantized transform coefficients during the JPEG 2000 compression process. In addition, based on the decodability of the quantized coefficients with the embedded digital watermark, unauthorized use of the digital contents is detected. In the first embodiment, these techniques are applied to a coding device and an image processing/managing apparatus.

Figure 6:
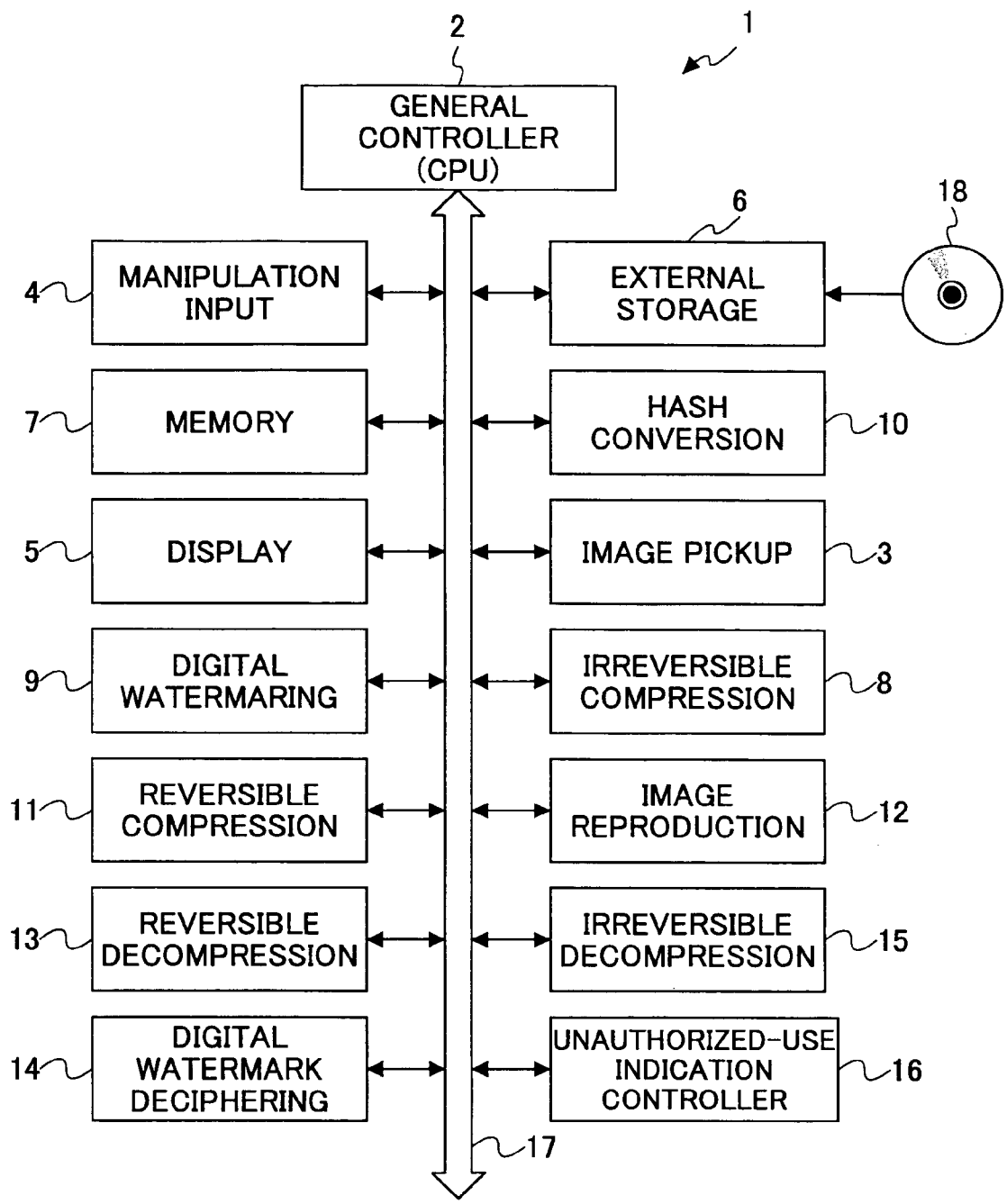
FIG. 6 is a block diagram schematically illustrating the structure of the image processing apparatus according to the first embodiment of the invention.

FIG. 6 is a block diagram of the image processing/managing apparatus according to the first embodiment. In FIG. 6, both the hardware structure and software functions performed by a microcomputer are shown for the sake of convenience.

The image processing/managing apparatus 1 comprises a general controller 2, an image pickup unit 3, a manipulation input unit 4, a display unit 5, an external storage 6, a memory 7, an irreversible compression unit 8, a digital watermarking unit 9, a hash conversion unit 10, a reversible compression unit 11, an image reproducing unit 12, a reversible decompression unit 13, a digital watermark deciphering unit 14, an irreversible decompression unit 15, and an unauthorized use indication controller 16, which are mutually connected through a bus line 17.

The general controller 2 includes a microcomputer (not shown) as the major component, which controls the overall operations and functions of the image processing/managing apparatus 1. The microcomputer comprises a CPU for driving and controlling the operations of the respective components of the image processing/managing apparatus 1, a ROM (not shown) for storing various control programs executed by the CPU, and a RAM (not shown) storing variable data in a rewritable manner and also functioning as a work area of the CPU. The microcomputer is often simply called a "CPU" as representing its typical function. The microcomputer (or CPU) has a time counting function. When embedding a digital watermark (which will be described later), date and time information is acquired by the time counting function. To this end, the time counter of the CPU functions as date information acquiring means.

ROM stores various types of control programs to be executed by the general controller 2. The functions of the image pickup unit 3, manipulation input unit 4, display unit 5, external storage 6, memory 7, irreversible compression unit 8, digital watermarking unit 9, hash conversion unit 10, reversible compression unit 11, image reproducing unit 12, reversible decompression unit 13, digital watermark deciphering unit 14, irreversible decompression unit 15, and unauthorized use indication controller 16 are implemented by the general controller 2 that executes the associated programs.

The image pickup unit 3 takes a picture or reads an image by scanning photographs or documents, and inputs image data. To this end, the image pickup unit 3 functions as image input means. The image pickup unit 3 is, for example, a digital camera, or an image scanner with an optical scanning system, an image sensor (such as a CCD) and the driving circuit thereof. Since the image pickup unit 3 is realized by any known technique, explanation and illustration for it is omitted here.

Manipulation input unit 4 functions as an interface between the user and the image processing/managing apparatus 1, and supplies various types of input signals to the general controller 2 in response to the user's manipulation. Upon receiving the signals from the manipulation input unit 4, the general controller 2 generates an instruction for selecting and implementing a function, editing data, and supplying the edited data. The manipulation input unit 4 is also realized by a known technique using a keyboard, a mouse, or a touch panel, and explanation and illustration for it is omitted. In the embodiment, the user's input through the manipulation input unit 4 causes randomization of image data with an embedded digital watermark to be started, or supplies necessary information required to decipher the digital watermark embedded in the randomized image data.

The display unit 5 displays an image acquired by the image pickup unit 3 and operational guidance. Although not shown in the drawings, the display unit 5 has color input terminals corresponding to the respective colors of red (R), green (G), and blue (B) represented on the display screen. By adjusting the signals input through the color input terminals, the brightness (or the intensity) of each color can be adjusted from the minimum (black) to the maximum (white) in a stepwise manner, and the respective color components adjusted to the desired brightness can be synthesized. The display mode can also be adjusted by the user through the manipulation input unit 4. The user can select a desired display mode, for example, displaying the deciphered result of the digital watermark superimposed on the input image data, or displaying only one of the digital watermark and the image data.

The external storage 6 allows the image data acquired by the image pickup unit 3 to be stored in a portable recording medium (e.g., a CDROM) 18, and reads programs from the portable recording medium 18 so that the programs are executed by the general controller 2. The external storage 6 also allows digitally-watermarked compression data that have been subjected to digital watermarking by the digital watermarking unit 9 and reversible compression by reversible compression unit 11, and data representing the tampered portion detected by the digital watermark deciphering unit 14, to be stored in the recording medium 18.

The external storage 6 can reads a coding program and/or an image processing program from the portable recording medium 18. By reading and executing the coding program or the image processing program stored in the recording medium 18, digital watermarking or detection of the embedded watermark is carried out in the image processing/managing apparatus 1. In this embodiment, the portable recording medium 18 functions as a storage medium.

The recording medium storing such programs is not limited to a CDROM, and arbitrary types of recording media, such as flexible disks (FDs) and magneto-optical disks, can be used to store the programs. The coding program and the image processing program are read (or installed) from the recording medium 18 by the external storage 6, and loaded in RAM so that the general controller 2 executes the coding program and the image processing program for embedding or detecting a digital watermark. The RAM also functions as a temporary storage medium.

The coding program and the image processing program are not necessarily distributed in a storage medium, and they may be supplied from an external apparatus through a network (such as the Internet).

Memory 7 is a large-capacity memory that stores image data acquired by the image pickup unit 3 or various types of data generated through the operation of the JPEG 2000 algorithm shown in FIG. 1. The memory 7 is realized as a RAM or a hard disk. Examples of data resulting from JPEG 2000 algorithm include code streams obtained after digital watermarking and JPEG 2000 compression, which may be temporarily stored before being output, reproduced image data with the embedded digital watermark generated by the image reproducing unit 12, and decoded image data decompressed by reversible decompression unit 13 or irreversible decomposition unit 15. The memory 7 has a memory area that stores the manufacturing number of the image processing/managing apparatus 1 and secret information externally input to the image processing/managing apparatus 1 when embedding a digital watermark. With this arrangement, information based on the manufacturing number stored in the memory area can be used as the seed in hash conversion when a digital watermark is embedded in the image data (which is described below), whereby manufacturing number acquiring means is realized.

Irreversible compression unit 8 performs compression on digital image data in an irreversible manner, based on the image data acquired by the image pickup unit 3 and stored in the external storage 6 or the memory 7, and produces a set of quantized coefficients. In other words, the irreversible compression unit 8 carries out process A indicated by the arrow A in FIG. 1. The quantized coefficients produced by the irreversible compression unit 8 are stored in the memory 7.

Digital watermarking unit 9 embeds a digital watermark during the JPEG 2000 compression process using the quantized coefficients, which have been produced by the irreversible compression unit 8 and stored in the memory 7. Although the details are explained below, the digital watermarking unit 9 performs digital watermarking between process A and process B shown in FIG. 1, using randomized data (or hash-converted data) produced by the hash conversion unit 10 as the digital watermark.

Hash conversion unit 10 carries out hash conversion to randomize the quantized coefficients based on hash functions when the digital watermarking unit 9 performs digital watermarking.

In this embodiment, "randomizing" is a process for modifying data so that the original data cannot be deciphered, and it is distinguished from "encrypting" that includes a function of restoring to the original state.

The hash function is a one-way random number generating function for generating a random number using an argument as the seed, and has the natures listed below. (The source is SAKO, Kazue, "Guarantee of Fairness and Protection of Privacy", Transactions of the Institute of Electronic, Information and Communication Engineers, February, 2000.)

(1) Input values cannot be estimated from output values;
(2) If the input value varies even by one bit, the output value totally changes; and
(3) It is practically impossible for two inputs to have the same output value.

Because it is impossible with hash conversion to estimate original data from the post-conversion data, unauthorized (or dishonest) use of digital contents can be detected reliably by employing hash conversion for digital watermarking.

Reversible compression unit 11 performs process B shown in FIG. 1, that is, a reversible conversion process. By performing reversible compression on quantized coefficients in which a digital watermark has been embedded by the digital watermarking unit 9, the data are compressed without degrading the quantized coefficients with the embedded digital watermark. The data compressed by the reversible compression unit 11 are stored in the external storage 6 or the memory 7.

Image reproducing unit 12 controls the process for reading the JPEG 2000 compression data from the external storage 7 or the memory 6.

Reversible decompression unit 13 carries out process C shown in FIG. 1. The reversible decompression unit 13 performs reverse conversion, which corresponds to the conversion process carried out by the reversible compression unit 11, on the JPEG 2000 compression data read out by the image reproducing unit 12, and restores the quantized coefficients in a reversible manner. The qunatized coefficients restored by the reversible decompression unit 13 are stored in the memory 7.

Digital watermark deciphering unit 14 determines the presence or absence of unauthorized use, between process C and process D shown in FIG. 1, based on the determination of whether the digital watermark embedded in the quantized coefficients restored by the reversible decomposition unit 13 is decipherable. Although the details are described below, the digital watermark deciphering unit 14 attempts to decipher the digital watermark embedded by randomizing the quantized coefficients through hash conversion. If the digital watermark cannot be deciphered by the digital watermark deciphering unit 14, then the location of the undecipherable block is stored in the memory 7.

For the deciphering operation by the digital watermark deciphering unit 14, the hash conversion unit 10 carries out conversion of hash functions to randomize the quantized coefficients during the JPEG 2000 decompression process shown in FIG. 1.

Irreversible decomposition unit 15 performs process D shown in FIG. 1, and restores the data through reverse conversion corresponding to the conversion process carried out by the irreversible compression unit 8, based on the detection result of the unauthorized use determined by the digital watermark deciphering unit 14.

If a block containing the undecipherable digital watermark is detected, the unauthorized use indication controller 16 develops image data such that the image portion at the block location of the undecipherable digital watermark is darkened, based on the restored image data and the location of the decipherable block stored in the memory 7.

Figure 7:
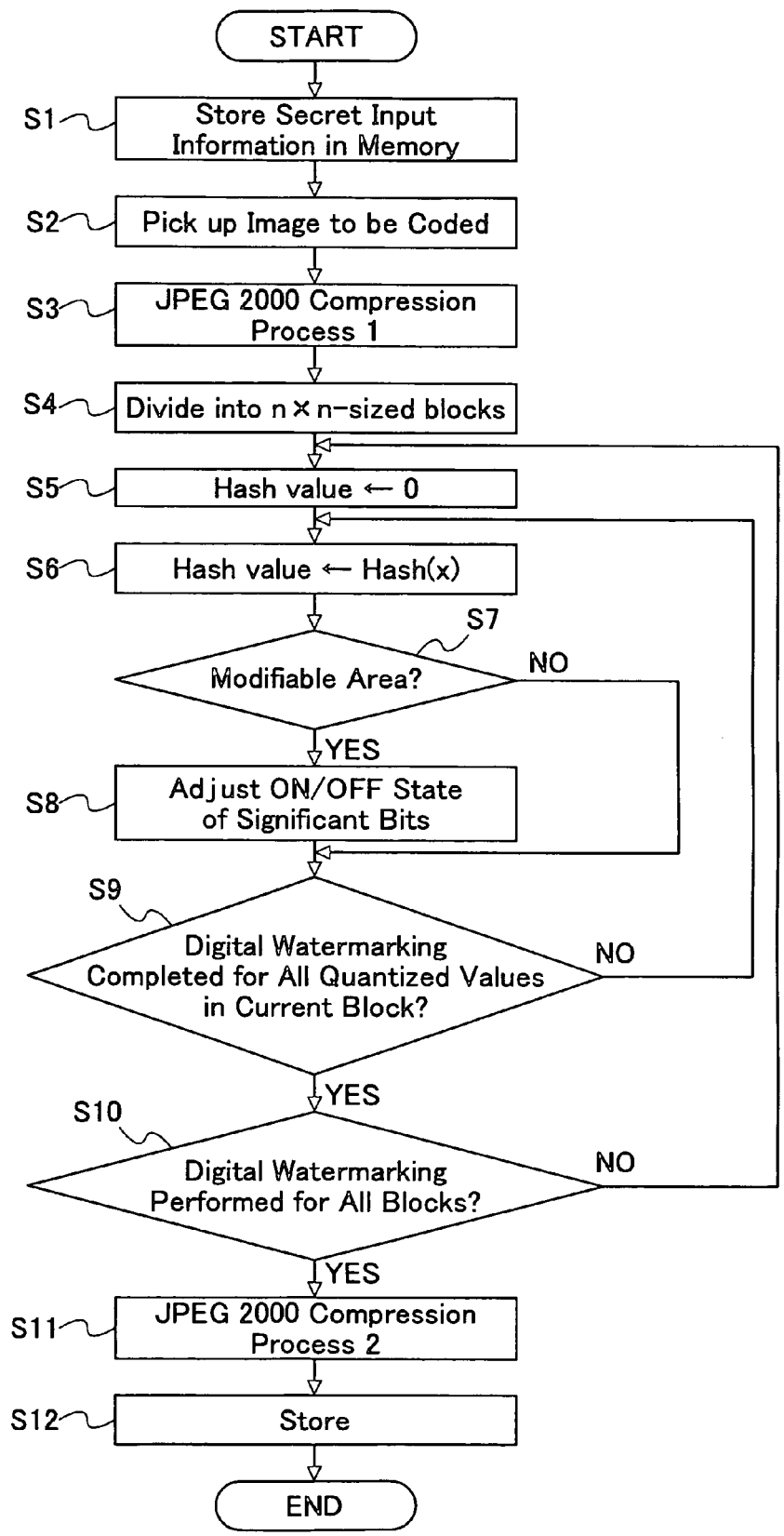
FIG. 7 is a flowchart showing the operation carried out by the image processing apparatus to embed a watermark.

Next, the operation carried out by the image processing/managing apparatus 1 when embedding a digital watermark is explained below, with reference to FIG. 7. In this embodiment, digital watermarking is carried out by executing an encoding program. The process shown in FIG. 7 is performed when the image pickup unit 3 acquires an image. Prior to photographing by the image pickup unit 3, the user manipulates the input secret key of the manipulation input unit 4 to input secret information. Here, a function as secret input means is realized. Secret information includes a password consisting of plural digits represented by alphanumeric characters and numbers, which can be arbitrarily chosen by the user.

The information input through the input secret key is stored in the memory 7 (step S1). Then, the image of the photographed object is read as multi-level image data, and stored in the memory 7 (step S2).

The multi-level image stored in the memory 7 is subjected to color space conversion. Then, discrete wavelet transform is performed by the irreversible compression unit 8 to convert the data into frequency components for quantization (step S3). The process carried out in step S3 is referred to as "JPEG 2000 compression process 1". This JPEG 2000 compression process 1 realizes a quantization function and qunatization means.

Figure 8A:
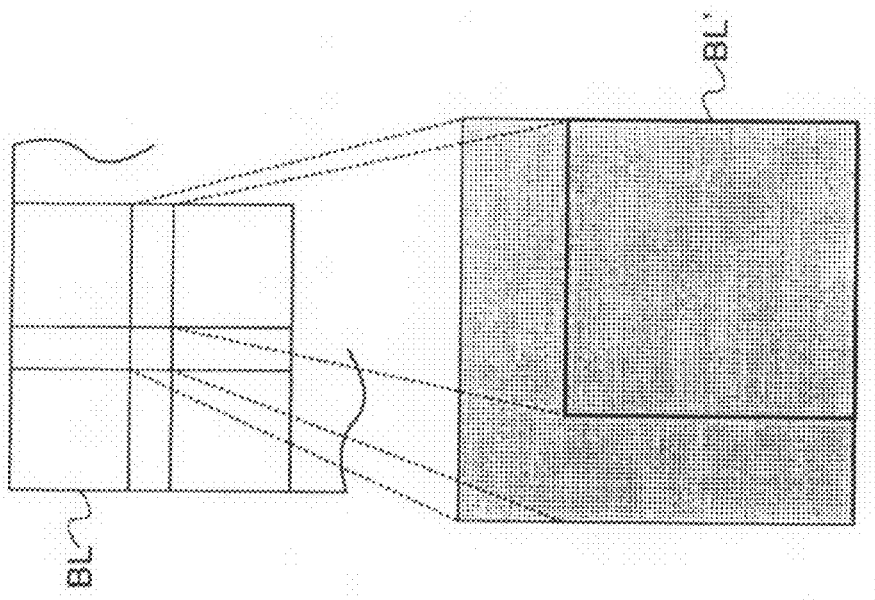
FIG. 8A and FIG. 8B are examples of divided blocks.
Figure 8B:
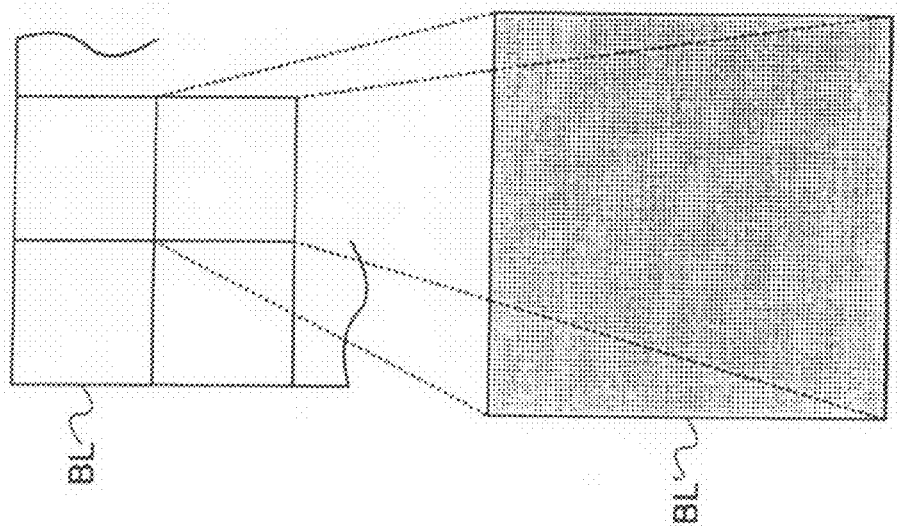

Then, the set of quantized coefficients obtained in JPEG 2000 compression process 1 is divided into blocks (BLs), each having a size of n×n (step S4) Here, dividing means and a dividing function for dividing the quantized coefficients into a plurality of blocks are implemented. Adjacent blocks BLs may be arranged so as not to overlap each other, as illustrated in FIG. 8A, or alternatively, they may be arranged so that a portion of a block overlaps the adjacent blocks, as illustrated in FIG. 8B. Each block may be set to the same size as, or a different size from the tile used in the quantization in step S3.

Then, seed data, which are used as the seed for generating a random number to randomize a block of quantized coefficients, are initialized (step S5). By initializing the seed data, a tampered portion can be identified block by block when tampering is detected through detection of unauthorized use, which is described below.

Then, a new hash value (encoding hash value) is acquired, with reference to the memory 7 and based on the secret information input by the user and stored in the memory 7, information directed to the manufacturing number of the image processing/managing apparatus 1, or date information obtained by the time counting function of the microcomputer (step S6). Here, hash conversion means and a hash conversion function are implemented.

It should be noted that the encoding hash value acquired in step S6 is not limited to the secret information, date information, and the manufacturing number. An already acquired encoding hash value or a quantized coefficient generated in step S3 may be used. Among the above-described information items (secret information stored in the memory 7, the manufacturing number relating information, the date information, the already acquired hash number, and the quantized coefficient generated in step S3), one of them may be used alone as the new encoding hash value, or alternatively, two or more information items may be combined as the new encoding hash value. It is preferable to acquire a hash value using as much data as possible in order to detect unauthorized use in a reliable manner.

Accordingly, in the embodiment, input secret information, the manufacturing number of the image processing/managing apparatus 1, the date information, and other suitable information items are used, in addition to the quantized coefficient, as the seed data for the encoding hash conversion, thereby rendering the digital watermark undecipherable to a third party.

For example, arbitrary information may be selected from among various information items including the input secret information, the manufacturing number of of the of the image processing/managing apparatus 1, the date information, the already existing encoding hash values, and qantized coefficients generated in step S6, through manipulation by the manipulation input unit 4. Then, the selected information may be added as the seed to the target block of quantized coefficients to be processed to perform hash conversion. Here, selecting means and a selecting function are implemented. By making the argument used as the seed of hash conversion selective, the digital watermark can be made more effective against deciphering by a third party.

Then, it is determined whether the target coefficient in the current block is modifiable, based on a determination of whether the target coefficient is located in an area that does not overlap the adjacent blocks BLs (step S7). If the array of quantized coefficients is divided into independent non-overlapping blocks, as illustrated in FIG. 8A, the current block does not overlap any of the adjacent blocks, and therefore, it is determined that the entire region of the current block surrounded by the bold line resides in the modifiable area BL'. On the other hand, if the coefficient array is divided into overlapping blocks, as illustrated in FIG. 8B, then it is determined that the region contained in the non-overlapping region defined by the bold line resides in the modifiable area BL'.

If it is determined that the target portion is in the modifiable area (YES in S7), the ON/OFF state of the significant bits is adjusted such that the relation between information defined by N (N is an even number) significant bits Qnm(x, y) (x=0, 1, ..., y=0, 1, ...) of the $m^{th}$ bit plane of the $n^{th}$ block BL and a natural number T satisfies either the ON state expressed by equation (1), or the OFF state expressed by equation (2), depending on whether the encoding hash value of the $n^{th}$ block BL is odd or even, in order to embed a digital watermark (step S8). Here, digital watermarking means and a digital watermarking function are implemented.

$$\left| \sum_{k=1}^{\frac{1}{2}N} Qnm(ik,\ jk) \right| - \left| \sum_{k=\frac{1}{2}N+1}^{N} Qnm(ik,\ jk) \right| > T \quad (1)$$

$$\left| \sum_{k=\frac{1}{2}N+1}^{N} Qnm(ik,\ jk) \right| - \left| \sum_{k=1}^{\frac{1}{2}N} Qnm(ik,\ jk) \right| < T \quad (2)$$

In this context, a "significant" state is the state in which it is known that the value of the target coefficient is non-zero when the target quantized coefficient is encoded from the higher bit to the lower bit, where the bit with a value "1" represents an already encoded bit. In contrast, an "insignificant" state is the state in which the value of the target coefficient is or likely to be "0", and the bit with a value "1" has not been encoded yet.

A "natural number T" is selected arbitrarily according to the desired durable strength of the digital watermark to be embedded. The greater the natural number T is, the higher the durability of the digital watermark. Although the durability of the digital watermark against alteration of or tampering with the image data can be increased by setting a natural number of a greater value, the quality of the reproduced image becomes inferior, as compared with the original image that has not been subjected to digital watermarking. On the other hand, as natural number T becomes smaller, the durability against tampering with or alteration of the image data becomes feeble. However, the original image quality can be maintained with less degradation even after the digital watermarking. To this end, it is preferable to set natural number T to a value slightly smaller than that causing the image degradation to be conspicuous due to digital watermarking. Natural number T may be set by the user depending on the desired image quality.

In this example, four significant bits Qnm (i1, j1), Qnm (i2, j2), Qnm (i3, j3), and Qnm (i4, j4) are employed to form a set of bit information in step S8. If the hash value obtained in step S6 is an odd number, then the significant bits are adjusted such that the relation between natural number T and bit information defined by the four significant bits Qnm (i1, j1), Qnm (i2, j2), Qnm (i3, j3), and Qnm (i4, j4) becomes the ON state, satisfying equation (9). If the hash value obtained in step S6 is an even number, the significant bits are adjusted so that the relation between natural number T and the bit information defined by the four significant bits Qnm (i1, j1), Qnm (i2, j2), Qnm (i3, j3), and Qnm (i4, j4) becomes the OFF state, satisfying equation (10). In this manner, depending on whether the hash value is odd or even, the process shown below is repeated until the relation between natural number T and the bit information defined by the significant bits Qnm (i1, j1), Qnm (i2, j2), Qnm (i3, j3), and Qnm (i4, j4) satisfies equation (9) or (10).

$$|Qnm\ (i1,\ j1) + Qnm\ (i2,\ j2)| - |Qnm\ (i3,\ j3) + Qnm\ (i\ 4,\ j4)| > T \quad (9)$$

```
{
    if(0 ≤ Qnm (i3,j3)+Qnm (i4,j4))
    then
    {
        if(2 ≤ Qnm (i3,j3)+Qnm (i4,j4))
        {
            Qnm (i3,j3)=Qnm (i3,j3) − 1;
            Qnm (i4,j4)=Qnm (i4,j4) − 1;
        }
    }
    else
    {
        if(Qnm (i3,j3)+Qnm (i4,j4) ≤ −2)
        {
            Qnm (i3,j3)=Qnm (i3,j3) + 1;
            Qnm (i4,j4)=Qnm (i4,j4) + 1;
        }
    }
    if(0 ≤ Qnm (i1,j1)+Qnm (i2,j2))
    then
    {
        Qnm (i1,j1)=Qnm (i1,j1) + 1;
        Qnm (i2,j2)=Qnm (i2,j2) + 1;
    }
    else
    {
        Qnm (i1,j1)=Qnm (i1,j1) − 1;
        Qnm (i2,j2)=Qnm (i2,j2) − 1;
    }
}
```

$$|Qnm\ (i3,\ j3) + Qnm\ (i4,\ j4)| - |Qnm\ (i1,\ j1) + Qnm\ (i2,\ j2)| > T \quad (10)$$

```
{
    if (0 ≦ Qnm (i3,j3)+Qnm (i4,j4))
    then
    {
        Qnm (i3,j3)=Qnm (i3,j3) + 1;
        Qnm (i4,j4)=Qnm (i4,j4) + 1;
    }
    else
    {
        Qnm (i3,j3)=Qnm (i3,j3) − 1;
        Qnm (i4,j4)=Qnm (i4,j4) − 1;
    }
    if (0 ≦ Qnm (i1,j1)+Qnm (i2,j2))
    then
    {
        if (2 ≦ Qnm (i1,j1)+Qnm (i2,j2))
        {
            Qnm (i1,j1)=Qmn (i1,j1) − 1;
            Qnm (i2,j2)=Qnm (i2,j2) − 1;
        }
    }
    else
    {
        if (Qnm (i1,j1)+Qnm (i2,j2) ≦ − 2)
        {
            Qnm (i1,j1)=Qnm (i1,j1) + 1;
            Qnm (i2,j2)=Qnm (i2,j2) + 1;
        }
    }
}
```

In this process, encoding is carried out from the higher bit to the lower bit of the target bit plane. To turn an OFF bit into the ON state, all the bits in the lower plane of the target bit plane are rendered OFF. When turning an ON bit into the OFF state, all the bits in the lower plane of the target bit plane are rendered ON.

With this arrangement, ON/OFF adjustment of the significant bit can be conducted uniformly in encoding from the higher bit to the lower bit of the bit plane, and consequently, image degradation due to digital watermarking can be reduced.

For example, four significant bits Qnm (i1, j1), Qnm (i2, j2), Qnm (i3, j3), and Qnm (i4, j4) are 0, 1, 0, and 0, respectively, natural number T is 3, and the hash value acquired in step S6 is an odd number. In this case, the process described in equation (9) is carried out so that the relation between natural number T and the bit information defined by significant bits Qnm (i1, j1), Qnm (i2, j2), Qnm (i3, j3), and Qnm (i4, j4) satisfies equation (9). The resulting values of the four significant bits Qnm (i1, j1), Qnm of the back (i2, j2), Qnm (i3, j3), Qnm (i4, j4) become 2, 3, 0, and 0, respectively, after the digital watermarking operation.

In addition, suppose that the significant bits Qnm (i1, j1), Qnm (i2, j2), Qnm (i3, j3), and Qnm (i4, j4) having been subjected to digital watermarking are 2, 3, 0, and 0, respectively, that natural number T is 3, and that the hash value acquired in step S6 is an even number. In this case, the process described below equation (10) is carried out so that the relation between natural number T and the bit information defined by the significant bits Qnm (i1, j1), Qnm (i2, j2), Qnm (i3, j3), and Qnm (i4, j4) satisfies equation (10). The resulting values of Qnm (i1, j1), Qnm (i2, j2), Qnm (i3, j3), and Qnm (i4, j4) become 0, 1, 3, and 3, respectively, after the second digital watermarking.

Furthermore, suppose that the significant bits Qnm (i1, j1), Qnm (i2, j2), Qnm (i3, j3), and Qnm (i4, j4) having been subjected to digital watermarking twice are 0, 1, 3, and 3, respectively, that natural number T is 3, and that the hash value acquired in step S6 is an odd number. Then, the process shown above equation (9) is carried out so that the relation between natural number T and the bit information defined by the significant bits Qnm (i1, j1), Qnm (i2, j2), Qnm (i3, j3), and Qnm (i4, j4) satisfies equation (9). The resulting values of the significant bits Qnm (i1, j1), Qnm (i2, j2), Qnm (i3, j3), and Qnm (i4, j4) become 3, 4, 0, and 0 respectively, after the third digital watermarking.

In the subsequent trial of digital watermarking, no matter how many times the process is repeated, the significant bits Qnm (i1, j1), Qnm (i2, j2), Qnm (i3, j3), and Qnm (i4, j4) take a set of values (3, 4, 0, 0) and (0, 1, 3, 3) alternately.

The iteration illustrated below equation (9) or (10), which is repeated until the relation between natural number T and the four significant bits Qnm (i1, j1), Qnm (i2, j2), Qnm (i3, j3), and Qnm (i4, j4) and a certain natural number T satisfies equation (9) or (10) depending on whether the hash value is odd or even, is more effective to reduce image degradation, as compared with using the operations A and B shown below.

```
A
{
    if(0 ≦ Qnm (i3,j3)+Qnm (i4,j4))
    then
    {
        Qnm (i3,j3)=Qnm (i3,j3) − 1;
        Qnm (i4,j4)=Qnm (i4,j4) − 1;
    }
    else
    {
        Qnm (i3,j3)=Qnm (i3,j3) + 1;
        Qnm (i4,j4)=Qnm (i4,j4) + 1;
    }
    if(0 ≦ Qnm (i1,j1)+Qnm (i2,j2))
    then
    {
        Qnm (i1,j1)=Qnm (i1,j1) + 1;
        Qnm (i2,j2)=Qnm (i2,j2) + 1;
    }
    else
    {
        Qnm (i1,j1)=Qnm (i1,j1) − 1;
        Qnm (i2,j2)=Qnm (i2,j2) − 1;
    }
}
B
{
    if(0 ≦ Qnm (i3,j3)+Qnm (i4,j4))
    then
    {
        Qnm (i3,j3)=Qnm (i3,j3) + 1;
        Qnm (i4,j4)=Qnm (i4,j4) + 1;
    }
    else
    {
        Qnm (i3,j3)=Qnm (i3,j3) − 1;
        Qnm (i4,j4)=Qnm (i4,j4) − 1;
    }
    if(0 ≦ Qnm (i1,j1)+Qnm (i2,j2))
    then
    {
        Qnm (i1,j1)=Qnm (i1,j1) − 1;
        Qnm (i2,j2)=Qnm (i2,j2) − 1;
    }
    else
    {
        Qnm (i1,j1)=Qnm (i1,j1) + 1;
        Qnm (i2,j2)=Qnm (i2,j2) + 1;
    }
}
```

With operations A and B, again suppose that the significant bits Qnm (i1, j1), Qnm (i2, j2), Qnm (i3, j3), and Qnm (i4, j4)

are 0, 1, 0, and 0, respectively, that natural number T is 3, and that the hash value acquired in step S6 is an odd number. In this case, operation A is carried out so that the relation between natural number T and the bit information defined by significant bits Qnm (i1, j1), Qnm (i2, j2), Qnm (i3, j3), and Qnm (i4, j4) satisfies equation (9). Then, the resulting values of the four significant bits Qnm (i1, j1), Qnm of the back (i2, j2), Qnm (i3, j3), Qnm (i4, j4) become 2, 3, 0, and 0, respectively, after the digital watermarking operation.

In this state, the second digital watermarking is carried out. The significant bits Qnm (i1, j1), Qnm (i2, j2), Qnm (i3, j3), and Qnm (i4, j4) having been subjected to digital watermarking are 2, 3, 0, and 0, respectively, the natural number T is 3, and the hash value acquired in step S6 is an even number. Accordingly, operation B is carried out so that the relation between natural number T and the bit information defined by the significant bits Qnm (i1, j1), Qnm (i2, j2), Qnm (i3, j3), and Qnm (i4, j4) satisfies equation (10). The resulting values of Qnm (i1, j1), Qnm (i2, j2), Qnm (i3, j3), and Qnm (i4, j4) become −1, 0, 3, and 3, respectively, after the second digital watermarking.

Furthermore, suppose that the significant bits Qnm (i1, j1), Qnm (i2, j2), Qnm (i3, j3), and Qnm (i4, j4) having been subjected to digital watermarking twice are −1, 0, 3, and 3, respectively, that natural number T is 3, and that the hash value acquired in step S6 is an odd number. Then, operation A is carried out so that the relation between natural number T and bit information defined by significant bits Qnm (i1, j1), Qnm (i2, j2), Qnm (i3, j3), and Qnm (i4, j4) satisfies equation (9). The resulting values of the significant bits Qnm (i1, j1), Qnm (i2, j2), Qnm (i3, j3), and Qnm (i4, j4) become 4, −3, 0, and 0 respectively, after the third digital watermarking.

In the subsequent trial of digital watermarking, no matter how many times the process is repeated, the significant bits Qnm (i1, j1), Qnm (i2, j2), Qnm (i3, j3), and Qnm (i4, j4) take a set of values (−4, −3, 0, 0) and (−1, 0, 3, 3) alternately.

It is found that the operation result of the preferred embodiment using the processes illustrated directly above equation (9) and equation (10) has much less deviation from the original data, as compared with the result using operations A and B. This means that the image degradation due to digital watermarking can be reduced more effectively.

In the above-described specific example of the first embodiment, a set of bit information is formed of four significant bits Qnm (i1, j1), Qnm (i2, j2), Qnm (i3, j3), and Qnm (i4, j4), and if the hash value acquired in step S6 is an odd number, the bit information is adjusted into the ON state, so that the relation between natural number T and the bit information defined by the significant bits Qnm (i1, j1), Qnm (i2, j2), Qnm (i3, j3), and Qnm (i4, j4) satisfies equation (9). If the hash value acquired in step S6 is an even number, the bit information adjusted into the OFF state, so that the relation between natural number T and the bit information defined by the significant bits Qnm (i1, j1), Qnm (i2, j2), Qnm (i3, j3), and Qnm (i4, j4) satisfies equation (10).

However, the present invention is not limited to the above-described example, and the condition may be modified. For instance, the ON/OFF state of the bit information may be adjusted so that if the hash value acquired in step S6 is an even number, the relation between natural number T and the bit information defined by the significant bits Qnm (i1, j1), Qnm (i2, j2), Qnm (i3, j3), and Qnm (i4, j4) may be brought into the ON state, satisfying equation (9). In this case, if the hash value acquired in step S6 is an odd number, the bit information is adjusted so that the relation between natural number T and the bit information defined by the significant bits Qnm (i1, j1), Qnm (i2, j2), Qnm (i3, j3), and Qnm (i4, j4) is brought into the OFF state, satisfying equation (10). This alternative ON/OFF adjustment is referred to as the second mode.

In the embodiment, the ON/OFF adjustment is selectively switched between the first mode, in which the relation between natural number T and bit information defined by significant bits is adjusted to the ON state with an odd hash value and to the OFF state with an even hash value, and the second mode, in which the relation between natural number T and bit information defined by significant bits is adjusted to the ON state with an even hash value and to the OFF state with an odd hash value. The ON/OFF adjusting mode may be set selectively when the image processing/managing apparatus 1 is manufactured (before shipping), or alternatively, the mode may be switched by the user through the manipulation input unit 4. Here, mode setting means and a mode setting function are implemented.

In addition, mode switching between the first mode and the second mode may be conducted based on the hash value acquired in step S6 and the coordinate value in the image of the target quantized coefficient. In this case, the first mode or the second mode is selected depending on whether the product of the hash value and the coordinate value is odd or even. This arrangement can make the digital watermark more undecipherable and more durable against unauthorized use by a third party. If secret information consisting of numerical values is input through the manipulation input unit 4, the mode switching may be performed based on the hash value acquired in step S6 and the secret information input through the manipulation input unit 4. In this case, the first mode or the second mode is selected depending on whether the product of the hash value and the secret information is odd or even. This arrangement can also make the digital watermark stronger against a third party.

In either the first or second mode, no matter how many times digital watermarking is carried out, variation of each of N (N equals four in this example) significant bits can be maintained so as not to exceed the absolute value of natural number T, and therefore, image degradation can be reduced efficiently even after several times of digital watermarking.

If in step S7 the location of the target quantized coefficient is outside the modifiable area (NO in S7), the process jumps to step S9, while maintaining the quantized coefficient as it is, without carrying out ON/OFF adjustment of the significant bits.

Then, it is determined whether all the quantized coefficients in the current block have been subjected to the digital watermarking process (step S9). If digital watermarking has not be completed for all the target coefficients of the current block (NO in S9), the process returns to step S6, and the operation from step S6 through step S8 are repeated.

If digital watermarking has been completed for all the quantized coefficients in the current block (YES in S9), then, it is determined whether digital watermarking has been completed for all the blocks BLs (step S10).

If digital watermarking has been completed for all the blocks BLs (YES in S10), reversible compression is carried out on the quantized coefficients having been subjected to digital watermarking by the reversible compression unit 11 to produce a code stream (step S11). The code stream is stored in the external storage 6 or the memory 7. The process carried out in step S11 is referred to as "JPEG 2000 compression process 2", which realizes coding means and a coding function. The code stream produced by the coding means is stored in the memory 7 or the external storage 6.

Although in the embodiment the bit information of the significant bits of the quantized coefficients is adjusted to the ON state when the hash value acquired in step S6 is odd, while setting to the OFF state when the hash value is an even number, the present invention is not limited to this example. For example, the bit information may be set to the OFF state when the hash value acquired in step S6 is odd, while setting to the ON state with an even hash value. The conditional relation between the hash value and the ON/OFF state of the bit information may be set during the manufacturing process of the image processing/managing apparatus 1.

Next, the operation performed by the image processing/reproducing apparatus 1 to detect unauthorized use of digital contents is explained below, with reference to FIG. 9. The detection is carried out using digital watermark embedded in the code stream. The process shown in FIG. 9 is executed when the image is reproduced by the image reproducing unit 12. In this embodiment, unauthorized use of digital contents (such as video data) is detected by executing the image processing program. Prior to reproducing the image at the image reproducing unit 12, the user inputs secret information through the input secret key of the manipulation input unit 4. This secret information is the same information as that input by the user prior to the coding process.

To detect unauthorized use, the secret information input by the user through the input secret key of the manipulation input unit 4 is stored in memory 7 (step S21). Then, the JPEG 2000 compression data are read out from the external storage 6 or memory 7 by the image reproducing unit 12 (step S22).

Then, color space reverse conversion is performed to the multi-level code stream read out from the storage, and this color-space converted code stream is decoded to a set of quantized coefficients (step S23). The process carried out in step S23 is called "JPEG 2000 decompression process 1", which realizes decoding means and a decoding function.

The quantized coefficients decoded through JPEG 2000 decompression process 1 is divided into multiple blocks BL, each having a size of n×n coefficients (step S24). Here, decoded block dividing means and a decoded block dividing function are implemented. The quantized coefficient array may be divided in such a manner that each block does not overlap any adjacent blocks, as illustrated in FIG. 8A, or alternatively, that a portion of the block overlaps adjacent blocks, as illustrated in FIG. 8B. The block size may be the same as the tile generated through decompression in step S23, or alternatively, the block size may be different from the tile size.

Then, seed data, which are used as the seed for generating a random number for a block of quantized coefficients, is initialized (step S25). By initializing the seed data, an altered portion can be identified block by block during detection of unauthorized use.

Then, a new hash value (decoding hash value) is acquired, with reference to the memory 7 and based on the secret information input by the user and stored in the memory 7, information directed to the manufacturing number of the image processing/managing apparatus 1, or date information obtained by the time counting function of the microcomputer (step S26). Here, decoding hash conversion means and a decoding hash conversion function are implemented.

It should be noted that the decoding hash value acquired in step S26 is not limited to the secret information, date information, and the manufacturing number. An already acquired decoding hash value or a quantized coefficient generated in step S23 may be used. Among the above-described information items (secret information stored in the memory 7, the manufacturing number relating information, the date information, the already acquired decoding hash number, and the quantized coefficient generated in step S23), one of them may be used alone as the new decoding hash value, or alternatively, two or more information may be combined as the coding hash value. It is preferable to acquire a decoding hash value using as much data as possible in order to detect unauthorized use in a reliable manner.

Then, it is determined whether the target coefficient in the current block is modifiable, based on a determination of whether the target coefficient is located in an area that does not overlap the adjacent blocks BLs (step S27). If the array of quantized coefficients is divided into independent non-overlapping blocks, as illustrated in FIG. 8A, the current block does not overlap any of the adjacent blocks, and therefore, it is determined that the entire region of the current block surrounded by the bold line resides in the modifiable area BL'. On the other hand, if the coefficient array is divided into overlapping blocks, as illustrated in FIG. 8B, then it is determined that the region contained in the non-overlapping region defined by the bold line resides in the modifiable area BL'.

If it is determined that the target portion is in the modifiable area (YES in S27), it is then determined whether the odd/even property represented by the ON/OFF state of the bit information defined by N (N is an even number) significant bits Qnm(x, y) (x=0, 1, ..., y=0, 1, ...) of the m$^{th}$ bit plane of the nth block BL matches the odd/even characteristic of the hash value of the n$^{th}$ block (step S28). The ON/OFF state of bit information is determined using equations (7) and (8). If the bit information of the significant bits Qnm satisfies equation (7), the bit information is in the ON state. If the bit information satisfies equation (8), then the bit information is in the OFF state. This odd/even matching judgment realizes unauthorized use detecting means and an unauthorized detecting function.

$$\left| \sum_{k=1}^{\frac{1}{2}N} Qn_k m_k(ik, jk) \right| > \left| \sum_{k=\frac{1}{2}N+1}^{N} Qn_k m_k(ik, jk) \right| \quad (7)$$

$$\left| \sum_{k=1}^{\frac{1}{2}N} Qn_k m_k(ik, jk) \right| < \left| \sum_{k=\frac{1}{2}N+1}^{N} Qn_k m_k(ik, jk) \right| \quad (8)$$

Since four significant bits Qnm (i1, j1), Qnm (i2, j2), Qnm (i3, j3), and Qnm (i4, j4) are used to adjust the ON/OFF state of bit information of the m$^{th}$ bit plane of the n$^{th}$ block during digital watermarking in the encoding process shown in FIG. 7, four significant bits Qnm (i1, j1), Qnm (i2, j2), Qnm (i3, j3), and Qnm (i4, j4) are again used in step S28. In this example, n1, n2, n3, and n4 used in equations (7) and (8) satisfy n1=n2=n3=n4, and m1, m2, m3, and m4 satisfy m1=m2=m3=m4.

In step S28, it is determined whether bit information defined by these four significant bits Qnm (i1, j1), Qnm (i2, j2), Qnm (i3, j3), and Qnm (i4, j4) becomes the ON state that satisfies equation (11) if the hash value acquired in step S26 is an odd number. It is also determined whether the bit information defined by the four significant bits Qnm (i1, j1), Qnm (i2, j2), Qnm (i3, j3), and Qnm (i4, j4) becomes the OFF state that satisfies equation (12) if the hash value acquired in step S26 is an even number.

$$|Qnm\,(i1,j1)+Qnm\,(i2,j2)|>|Qnm\,(i3,j3)+Qnm\,(i4,j4)| \quad (11)$$

$$|Qnm\,(i1,j1)+Qnm\,(i2,j2)|<|Qnm\,(i3,j3)+Qnm\,(i4,j4)| \quad (12)$$

If it is determined the relation among the four significant bits Qnm (i1, j1), Qnm (i2, j2), Qnm (i3, j3), and Qnm (i4, j4)

satisfies equation (11) or (12) (YES in S28), the process jumps to step S30. If there is no match in ON/OFF state (NO in S28), then it is determined that the image data is tampered with or dishonestly used, and this block location is stored in memory 7 (step S29). Here, tampered location storing means is realized.

If the location of the target quantized coefficient is outside the modifiable area (NO in S27), the process jumps to step S30, without conducting the matching operation for detecting unauthorized use.

Then, it is determined whether detection of unauthorized use has been completed for all the quantized coefficients in the current block (step S30). If detection has not been completed for all the coefficients (NO in S30), steps S26 through S29 are repeated until all the coefficients are examined.

In the above-described example, matching determination is carried out for all the quantized coefficients even if unauthorized use is detected in step S28. However, the present invention is not limited to this example. Once unauthorized use is detected at any of the quantized coefficients in the current block, further matching determination does not have to be carried out for the other quantized coefficients of this block, and the matching determination may proceed to the next block. This arrangement can reduce the workload for detecting unauthorized use.

If the matching determination has been conducted for all the quantized coefficients of the current block (YES in S30), then it is determined whether detection of unauthorized use has been completed for all the blocks BLs (step S31).

If all the blocks have been examined (YES in S31), irreversible decompression unit 15 performs irreversible decompression of the quantized coefficients to restore image data (step S32). The process carried out in step S32 is referred to as "JPEG 2000 decompression process 2", which realizes image generating means and an image generating function.

Based on the image data generated in step S31 (through the JPEG 2000 decomposition process 2) and the location of the altered (or dishonestly used) block stored in step S29, an image is displayed in such a manner that the block location at which unauthorized use has been detected is darkened (step S33). Here, emphasizing display means and an emphasizing display function are implemented.

In step S33, a portion of the image corresponding to the tampered block are darkened by minimizing the brightness of one of the input terminals for colors R, G, and B arranged in the display unit 5.

In this manner, if the reproduced image contains an image portion that has been tampered with or dishonestly used, the tampered block location is emphasized on the screen display unit 5. Since the altered portion is displayed as an artificial (or unnatural) image, the user can visually recognize the fact of unauthorized use by a third party and the altered location in the image. The tampered block location may be displayed in monochrome. This arrangement is practical because the tampered portion can be emphasized by simple processing.

Although in step S33 the restored image is displayed on the display unit 5 so that the altered block location is darkened, the present invention is not limited to this example. For example, the altered block location may be displayed with an inverted color of the original color, or with a single color, for instance, white or red.

As has been described above, in the first embodiment, the ON/OFF state of bit information defined by N (N=4 in the embodiment) significant bits Qnm (x, y) (x=0,1, . . . ;) of each bit plane of each block is adjusted in the digital watermarking process, such that the relation between natural number T and the bit information defined by the significant bits satisfies equation (1) (representing the ON state in this embodiment) or equation (2) (representing the OFF state in this embodiment), depending on whether the hash value of the associated (nth) block is odd or even. Consequently, the arithmetic operation of digital watermarking is closed in a single bit plane. Even if several bit planes are cut off during entropy coding conducted after quantization, the embedded digital watermark is maintained. In addition, since the data value of the digital watermark is determined for each block, unauthorized use of the digital contents (or the image data) can be detected block by block.

The ability to detect unauthorized use is preferably divulged to the user in advance, expecting the effect for preventing a user with good sense from willfully copying, tampering with, or misusing the image data.

By embedding a digital watermark in quantized coefficients using the technique described in the first embodiment, degradation of the digital watermark can be effectively prevented no matter how many times decoding is repeated.

When dividing the quantized coefficients into blocks, the overlapping amount of two adjacent blocks BLs may be set in an adjustable manner. The processing amount and rate of digital watermarking can be regulated by adjusting the size of each block regardless of whether adjacent blocks overlap or do not overlap each other.

Next, the second embodiment of the present invention is described below. The same elements as those in the first embodiment are denoted by the same symbols, and explanation for them will be omitted.

In the second embodiment, the image processing/managing apparatus 1 carries out the ON/OFF adjustment of significant bits in step S8 using a different operation from that described in the first embodiment in conjunction with FIG. 7.

The image processing/managing apparatus 1 performs the ON/OFF adjustment of significant bits, so that the relation between natural number T and bit information defined by N (N is an even number) significant bits $Qnm_j(x, y)$ (x=0, 1, . . . ;) of the mj-th bit plane of the n th block BL satisfies the ON state represented by equation (3) or the OFF state represented by equation (4), depending on whether the hash number of the $n^{th}$ block BL is odd or even. Here, digital watermarking means and a digital watermarking function are implemented.

$$\left|\sum_{k=1}^{\frac{1}{2}N} Qnm_k(ik, jk)\right| - \left|\sum_{k=\frac{1}{2}N+1}^{N} Qnm_k(ik, jk)\right| > T \quad (3)$$

$$\left|\sum_{k=\frac{1}{2}N+1}^{N} Qnm_k(ik, jk)\right| - \left|\sum_{k=1}^{\frac{1}{2}N} Qnm_k(ik, jk)\right| > T \quad (4)$$

In the second embodiment, four significant bits Qnm1 (i1, j1), Qnm2 (i2, j2), Qnm3 (i3, j3), and Qnm4 (i4, j4) are employed to form a set of bit information. The significant bits are adjusted so that if the hash value obtained in step S6 is an odd number, then the relation between natural number T and bit information defined by the four significant bits Qnm1 (i1, j1), Qnm2 (i2, j2), Qnm3 (i3, j3), and Qnm4 (i4, j4) becomes the ON state, satisfying equation (13), and so that if the hash value obtained in step S6 is an even number, the relation between natural number T and the bit information defined by the four significant bits Qnm1 (i1, j1), Qnm2 (i2, j2), Qnm3 (i3, j3), and Qnm4 (i4, j4) becomes the OFF state, satisfying equation (14). The process shown below is repeated until the relation between natural number T and the bit information defined by the significant bits Qnm1 (i1, j1), Qnm2 (i2, j2), Qnm3 (i3, j3), and Qnm4 (i4, j4) satisfies equation (13) or (14).

$$|Qnm_1 (i1,j1) + Qnm_2 (i2,j2)| - |Qnm_3 (i3,j3) + Qnm_4 (i4,j4)| > T \quad (13)$$

```
{
  if(0 ≤ Qnm₃ (i3,j3)+Qnm₄ (i4,j4))
  then
  {
    if(2 ≤ Qnm₃ (i3,j3)+Qnm₄ (i4,j4))
    {
      Qnm₃ (i3,j3)=Qnm₃ (i3,j3) – 1;
      Qnm₄ (i4,j4)=Qnm₄ (i4,j4) – 1;
    }
  }
  else
  {
    if(Qnm₃ (i3,j3)+Qnm₄ (i4,j4) ≤ –2)
    {
      Qnm₃ (i3,j3)=Qnm₃ (i3,j3) + 1;
      Qnm₄ (i4,j4)=Qnm₄ (i4,j4) + 1;
    }
  }
  if(0 ≤ Qnm₁ (i1,j1)+Qnm₂ (i2,j2))
  then
  {
    Qnm₁ (i1,j1)=Qnm₁ (i1,j1) + 1;
    Qnm₂ (i2,j2)=Qnm₂ (i2,j2) + 1;
  }
  else
  {
    Qnm₁ (i1,j1)=Qnm₁ (i1,j1) – 1;
    Qnm₂ (i2,j2)=Qnm₂ (i2,j2) – 1;
  }
}
```

$$|Qnm_3 (i3,j3) + Qnm_4 (i4,j4)| - |Qnm_1 (i1,j1) + Qnm_2 (i2,j2)| > T \quad (14)$$

```
{
  if(0 ≤ Qnm₃ (i3,j3)+Qnm₄ (i4,j4))
  then
  {
    Qnm₃ (i3,j3)=Qnm₃ (i3,j3) + 1;
    Qnm₄ (i4,j4)=Qnm₄ (i4,j4) + 1;
  }
  else
  {
    Qnm₃ (i3,j3)=Qnm₃ (i3,j3) – 1;
    Qnm₄ (i4,j4)=Qnm₄ (i4,j4) – 1;
  }
  if(0 ≤ Qnm₁ (i1,j1)+Qnm₂ (i2,j2))
  then
  {
    if(2 ≤ Qnm₁ (i1,j1)+Qnm₂ (i2,j2))
    {
      Qnm₁ (i1,j1)=Qnm₁ (i1,j1) – 1;
      Qnm₂ (i2,j2)=Qnm₂ (i2,j2) – 1;
    }
  }
  else
  {
    if(Qnm₁ (i1,j1)+Qnm₂ (i2,j2) ≤ – 2)
    {
      Qnm₁ (i1,j1)=Qnm₁ (i1,j1) + 1;
      Qnm₂ (i2,j2)=Qnm₂ (i2,j2) + 1;
    }
  }
}
```

The image processing/managing apparatus 1 also performs odd/even matching determination that corresponds to step S28 shown in FIG. 9. In the odd/even matching determination, it is determined whether the odd/even property represented by either the ON state, in which the relation between natural number T and bit information defined by N (N is an even number) significant bits Qnmj(x, y) (x=0, 1, ..., y=0, 1, ...) of the $mj^{th}$ bit plane of the $n^{th}$ block BL satisfies equation (15), or the OFF state, in which the relation between natural number T and the bit information satisfies equation (16), matches the odd/even characteristic of the hash value of the nth block BL. Here, unauthorized use detecting means and an unauthorized detecting function are implemented.

Since, in the second embodiment, four significant bits Qnm1 (i1, j1), Qnm2 (i2, j2), Qnm3 (i3, j3), and Qnm4 (i4, j4) are used to adjust the ON/OFF state of bit information of the $mj^{th}$ bit plane of the $n^{th}$ block during digital watermarking, four significant bits Qnm1 (i1, j1), Qnm2 (i2, j2), Qnm3 (i3, j3), and Qnm4 (i4, j4) are again used in step S28. In this example, n1, n2, n3, and n4 used in equations (5) and (6) satisfy n1=n2=n3=n4.

In step S28, it is determined whether bit information defined by these four significant bits Qnm1 (i1, j1), Qnm2 (i2, j2), Qnm3 (i3, j3), and Qnm4 (i4, j4) becomes the ON state that satisfies equation (15) if the hash value acquired in step S26 is an odd number. It is also determined whether the bit information defined by the four significant bits Qnm1 (i1, j1), Qnm2 (i2, j2), Qnm3 (i3, j3), and Qnm4 (i4, j4) becomes the OFF state that satisfies equation (16) if the hash value acquired in step S26 is an even number.

$$|Qnm1 (i1,j1) + Qnm2 (i2,j2)| > |Qnm3 (i3,j3) + Qnm4 (i4,j4)| \quad (15)$$

$$|Qnm1 (i1,j1) + Qnm2 (i2,j2)| < |Qnm3 (i3,j3) + Qnm4 (i4,j4)| \quad (16)$$

Since, in the second embodiment, a digital watermark is embedded across a plurality of bit planes using a plurality of significant bits, the durability of the digital watermark can be improved, while effectively reducing image degradation. In addition, since the locations in which the digital watermark is embedded are dispersed, the resolution of the target area, which is to be examined for detection of unauthorized use, can be increased.

Next, the third embodiment of the present invention is described.

In the third embodiment, the ON/OFF adjustment performed in step S8 of FIG. 7 is again modified from that of the first embodiment.

The image processing/managing apparatus 1 performs the ON/OFF adjustment of significant bits, so that the relation between natural number T and bit information defined by N (N is an even number) significant bits Qnimj(x, y) (x=0, 1, ...;) of the mj-th bit plane of the $n_i$-th block BL satisfies the ON state represented by equation (5) or the OFF state represented by equation (6), depending on whether the hash number of the $n^{th}$ block BL is odd or even. Here, digital watermarking means and a digital watermarking function are implemented.

$$\left| \sum_{k=1}^{\frac{1}{2}N} Qn_k m_k(ik, jk) \right| - \left| \sum_{k=\frac{1}{2}N+1}^{N} Qn_k m_k(ik, jk) \right| > T \quad (5)$$

$$\left| \sum_{k=\frac{1}{2}N+1}^{N} Qn_k m_k(ik, jk) \right| - \left| \sum_{k=1}^{\frac{1}{2}N} Qn_k m_k(ik, jk) \right| > T \quad (6)$$

In the third embodiment, four significant bits Qn1m1 (i1, j1), Qn2m2 (i2, j2), Qn3m3 (i3, j3), and Qn4m4 (i4, j4) are employed to form a set of bit information. The significant bits are adjusted so that if the hash value obtained in step S6 is an odd number, then the relation between natural number T and bit information defined by the four significant bits Qn1m1 (i1, j1), Qn2m2 (i2, j2), Qn3m3 (i3, j3), and Qn4m4 (i4, j4) becomes the ON state, satisfying equation (17), and so that if the hash value obtained in step S6 is an even number, the relation between natural number T and the bit information defined by the four significant bits Qn1m1 (i1, j1), Qn2m2 (i2, j2), Qn3m3 (i3, j3), and Qn4m4 (i4, j4) becomes the OFF state, satisfying equation (18). The process shown below is repeated until the relation between natural number T and the bit information defined by the significant bits Qn1m1 (i1, j1), Qn2m2 (i2, j2), Qn3m3 (i3, j3), and Qn4m4 (i4, j4) satisfies equation (17) or (18).

$$|Qn_1m_1 (i1,j1)+Qn_2m_2 (i2,j2)|-|Qn_4m_4 (i4,j4)|>T \quad (17)$$

```
{
    if(0 ≦ Qn₃m₃ (i3,j3)+Qn₄m₄ (i4,j4))
    then
    {
        if(2 ≦ Qn₃m₃ (i3,j3)+Qn₄m₄ (i4,j4))
        {
            Qn₃m₃ (i3,j3)=Qn₃m₃ (i3,j3) – 1;
            Qn₄m₄ (i4,j4)=Qn₄m₄ (i4,j4) – 1;
        }
    }
    else
    {
        if(Qn₃m₃ (i3,j3)+Qn₄m₄ (i4,j4) ≦ –2)
        {
            Qn₃m₃ (i3,j3)=Qn₃m₃ (i3,j3) + 1;
            Qn₄m₄ (i4,j4)=Qn₄m₄ (i4,j4) + 1;
        }
    }
    if(0 ≦ Qn₁m₁ (i1,j1)+Qn₂m₂ (i2,j2))
    then
    {
        Qn₁m₁ (i1,j1)=Qn₁m₁ (i1,j1) + 1;
        Qn₂m₂ (i2,j2)=Qn₂m₂ (i2,j2) + 1;
    }
    else
    {
        Qn₁m₁ (i1,j1)=Qn₁m₁ (i1,j1) – 1;
        Qn₂m₂ (i2,j2)=Qn₂m₂ (i2,j2) – 1;
    }
}
```

$$|Qn_3m_3 (i3,j3)+Qn_4m_4 (i4,j4)|-|Qn_1m_1 (i1,j1)+Qn_2m_2 (i2,j2)|>T \quad (18)$$

```
{
    if(0 ≦ Qn₃m₃ (i3,j3)+Qn₄m₄ (i4,j4))
    then
    {
        Qn₃m₃ (i3,j3)=Qn₃m₃ (i3,j3) + 1;
        Qn₄m₄ (i4,j4)=Qn₄m₄ (i4,j4) + 1;
    }
    else
    {
        Qn₃m₃ (i3,j3)=Qn₃m₃ (i3,j3) – 1;
        Qn₄m₄ (i4,j4)=Qn₄m₄ (i4,j4) – 1;
    }
    if(0 ≦ Qn₁m₁ (i1,j1)+Qn₂m₂ (i2,j2))
    then
    {
        if(2 ≦ Qn₁m₁ (i1,j1)+Qn₂m₂ (i2,j2))
        {
            Qn₁m₁ (i1,j1)=Qn₁m₁ (i1,j1) – 1;
            Qn₂m₂ (i2,j2)=Qn₂m₂ (i2,j2) – 1;
        }
    }
    else
    {
        if(Qn₁m₁ (i1,j1)+Qn₂m₂ (i2,j2) ≦ –2)
        {
            Qn₁m₁ (i1,j1)=Qn₁m₁ (i1,j1) + 1;
            Qn₂m₂ (i2,j2)=Qn₂m₂ (i2,j2) + 1;
        }
    }
}
```

The image processing/managing apparatus 1 also performs odd/even matching judgment that corresponds to step S28 shown in FIG. 9. In the odd/even matching judgment, it is determined whether the odd/even property represented by either the ON state, in which the relation between natural number T and bit information defined by N (N is an even number) significant bits Qnimj(x, y) (x=0, 1, . . . , y=0, 1, . . . ) of the $mj^{th}$ bit plane of the $ni^{th}$ block BL satisfies equation (5), or the OFF state, in which the relation between natural number T and the bit information satisfies equation (6), matches the odd/even characteristic of the hash value of the $ni^{th}$ block BL. Here, unauthorized use detecting means and an unauthorized detecting function are implemented.

Since, in the third embodiment, four significant bits Qn1m1 (i1, j1), Qn2m2 (i2, j2), Qn3m3 (i3, j3), and Qn4m4 (i4, j4) are used to adjust the ON/OFF state of bit information of the mj th bit plane of the nth block during digital watermarking, four significant bits Qn1m1 (i1, j1), Qn2m2 (i2, j2), Qn3m3 (i3, j3), and Qn4m4 (i4, j4) are again used in step S28.

In step S28, it is determined whether bit information defined by these four significant bits Qn1m1 (i1, j1), Qn2m2 (i2, j2), Qn3m3 (i3, j3), and Qn4m4 (i4, j4) becomes the ON state that satisfies equation (19) if the hash value acquired in step S26 is an odd number. It is also determined whether the bit information defined by the four significant bits Qn1m1 (i1, j1), Qn2m2 (i2, j2), Qn3m3 (i3, j3), and Qn4m4 (i4, j4) becomes the OFF state that satisfies equation (16) if the hash value acquired in step S26 is an even number.

$$|Qn1m1 (i1,j1)+Qn2m2 (i2,j2)|>|Qn3m3 (i3,j3)+Qn4m4 (i4,j4)| \quad (19)$$

$$|Qn1m1 (i1,j1)+Qn2m2 (i2,j2)|<|Qn3m3 (i3,j3)+Qn4m4 (i4,j4)| \quad (20)$$

Since, in the second embodiment, a digital watermark is embedded using plurality of significant bits of a plurality of bit planes of multiple blocks BLs, the locations in which the digital watermark is embedded are further dispersed. Consequently, the durability of the digital watermark can be further improved, and image degradation is reduced more effectively.

Next, the fourth embodiment of the present invention is described with reference to FIG. 10 and FIG. 11.

FIG. 10 is a flowchart of the operation carried out by the image processing/managing apparatus 1 when performing digital watermarking.

In the fourth embodiment, when the target (current) processing spot resides in a modifiable area (YES in S7), another determination step (S15) is carried out in order to determine whether the current processing spot is at a location to be decimated (or coefficients discarded). Here, quantized coefficient selecting means and a quantized coefficient selecting function are implemented.

In step S15, the determination for decimation is conducted by, for example, determining whether the current processing spot is a prescribed decimation spot, or whether the difference between the current coefficient and the adjacent coefficient exceeds a predetermined threshold value.

If it is determined that the current processing spot in the modifiable area is at a location to be decimated (NO in S15), then the process proceeds to step S8 to adjust the odd/even property of the significant bits Qnm(x, y) extracted from this quantized coefficient. As has been described above, the odd/even adjustment carried out in step S8 realizes digital watermarking means and a digital watermarking function.

If it is determined that the current processing spot is not at a location to be decimated (YES in S15), then the process jumps to step S9.

In the fourth embodiment, a digital watermark can be embedded selectively with respect to the quantized coefficients Qnm (x, y) of the modifiable area. This arrangement can reduce image degradation, as compared with the case in which all the quantized coefficients in the modifiable area are subjected to digital watermarking.

For example, those quantized coefficients located at a spot with a steep change with respect to the adjacent quantized coefficient (i.e., at an edge portion) are selected as targets to be decimated. By adjusting the ON/OFF state of the bit information only at the edge portion, deterioration of the image quality is rendered much less conspicuous, as compared with digital watermarking for all the coefficients in the entire modifiable area. Thus, the image degradation can be prevented efficiently.

Since the frequency of selecting a quantized coefficient as the target to be processed is adjustable in each block BL, the processing amount and the processing rate of the digital watermarking process can be regulated.

In addition, the threshold value used in step S15 is embedded, together with the digital watermark. Here, threshold embedding means and a threshold embedding function are implemented. Embedding a threshold value with respect to the quantized coefficient is performed by adjusting the ON/OFF state of a specific bit, as in the digital watermarking process. Since embedding of a threshold value is a known technique, detailed explanation for it is omitted here.

FIG. 11 is a flowchart of the operation carried out by the image processing/managing apparatus 1 when detecting unauthorized use of the digital contents from the code stream in which the digital watermark is embedded.

In this embodiment, if the current quantized coefficient in the $n^{th}$ block BL is in the modifiable area (YES in S27), it is then determined whether the current quantized coefficient in the modifiable area is at a location to be decimated (step S35). If the current quantized coefficnet is at the location to be decimated (YES in S35), the process proceeds to step S28, and it is determined whether the odd/even property represented by either the ON state, in which the relation between natural number T and bit information of N (N is an even number) significant bits Qnm(x, y) (x=0, 1, ..., y=0, 1, ... ) of the $m^{th}$ bit plane of the $n^{th}$ block BL satisfies equation (7), or the OFF state, in which the relation between natural number T and bit information of N significant bits satisfies equation (8), matches the odd/even characteristic of the hash value of the $n^{th}$ block. Here, unauthorized use detecting means and an unauthorized use detecting function are implemented.

If it is determined that the current quantized coefficient in the modifiable area is not a target to be decimated (YES in S35), the process jumps to step S30.

Digital watermarking and detection of unauthorized use of the fourth embodiment are explained above based on the techniques described in the first embodiment. However, the fourth embodiment, in which quantized coefficients to be processed are acquired in a selective manner, can be implemented based on the technique described in the second or the third embodiment.

In the present invention, by embedding a digital watermark in quantized coefficients, degradation of the digital watermark can be prevented even after repetition of encoding and decoding. By conducting ON/OFF adjustment of the significant bits in each single bit plane, the digital watermark can be maintained, without disappearing, even if several bit planes are cut off during the encoding operation, and consequently, unauthorized use can be detected accurately. In addition, since the hash value used in the ON/OFF adjustment of the significant bits is acquired block by block, unauthorized use can be detected block by block.

When ON/OFF adjustment of the significant bits is conducted across a plurality of bit planes, image degradation due to digital watermarking can be reduced more effectively because the ON/OFF adjusted significant bits are dispersed across the bit planes. This arrangement also improves the resolution of the processed region during the detection of unauthorized use.

When ON/OFF adjustment is conducted for the significant bits of a plurality of bit planes of a plurality of blocks, image degradation can be further reduced because of dispersion of the ON/OFF adjusted bits across the bit planes of the plural blocks. The resolution of the processed region can also be improved in detecting unauthorized use.

By allowing the first mode or the second mode to be selectively used for digital watermarking, the digital watermark embedded in the digital contents can be made undecipherable for a third party.

By performing the ON/OFF adjustment uniformly from the higher bit plane to the lower bit plane, image degradation due to digital watermarking can be reduced.

By performing the ON/OFF adjustment to only the selected quantized coefficients, image degradation can be reduced, as compared with the case in which all the quantized coefficients are subjected to the ON/OFF adjustment.

Especially, by performing the ON/OFF adjustment for those quantized coefficients that have a steep change from the adjacent coefficients (with a difference from the adjacent coefficients equal to or greater than the threshold value), image degradation due to digital watermarking can be reduced more efficiently.

The threshold value can be set in accordance with the purpose of use depending on, for example, the degree of image degradation or detection accuracy of unauthorized use.

The threshold value may be embedded in the code stream. In this case, the decoded threshold value can be used when detecting unauthorized use.

By acquiring quantized coefficients at a frequency in agreement with the target image quality, image degradation due to digital watermarking can be regulated.

By using some other information items (such as secret information, date information, or manufacturing number of the apparatus) in addition to the quantized coefficient as the seed of hash conversion, the embedded digital watermark can be made more undecipherable for the third party.

The image processing/managing apparatus can detect unauthorized use or willful tampering block by block. The user can visually recognize such unauthorized use.

The encoding operation of the code stream producing apparatus can be carried out by a computer readable program. Similarly, the decoding operation of the image processing/managing apparatus can be carried out by a computer readable program. In this case, the same advantages can be achieved.

This patent application is based on and claims the benefit of the earlier filing date of Japanese Patent Application No. 2002-338118 filed Nov. 21, 2002, the entire contents of which are hereby incorporated by reference.

The invention claimed is:

1. A code stream producing apparatus comprising:

at least one processor having a quantizer configured to quantize a frequency component obtained from a pixel value of an image through discrete wavelet transform to produce a set of quantized coefficients for each of a plurality of tiles of the image, a block processing unit configured to divide the set of quantized coefficients into a plurality of blocks, a hash conversion unit that carries out hash conversion for each of the blocks, based on the quantized coefficients of the block, to obtain an encoding hash value for each of the blocks, a bit plane defining unit configured to divide each of the blocks into a plurality of bit planes, a digital watermarking unit configured to adjust an ON/OFF state of significant bits such that the relation between information defined by N (N is an even number) significant bits Qnm(x, y) (x=0, 1, ..., y=0, 1, ...) of the mth bit plane of the $n^{th}$ block and a natural number T satisfies either the ON state expressed by equation (1), or the OFF state expressed by equation (2), depending on whether the encoding hash value of the nth block is odd or even, in order to embed a digital watermark, and an encoding unit configured to encode the set of quantized coefficients containing the ON/OFF adjusted siguificant bits, wherein equation (1) is $$\left| \sum_{k=1}^{\frac{1}{2}N} Qnm(ik, jk) \right| - \left| \sum_{k=\frac{1}{2}N+1}^{N} Qnm(ik, jk) \right| > T,$$

and wherein equation (2) is $$\left| \sum_{k=\frac{1}{2}N+1}^{N} Qnm(ik, jk) \right| - \left| \sum_{k=1}^{\frac{1}{2}N} Qnm(ik, jk) \right| > T.$$

2. A code stream producing apparatus comprising:

at least one processor having a quantizer configured to quantize a frequency component obtained from a pixel value of an image through discrete wavelet transform to produce a set of quantized coefficients for each of a plurality of tiles of the image, a block processing unit configured to divide the set of quantized coefficients into a plurality of blocks, a hash conversion unit configured to carry out hash conversion for each of the blocks, based on the quantized coefficients of the block, to obtain an encoding hash value for each of the blocks, a bit plane defining unit configured to divide each of the blocks into a plurality of bit planes, a digital watermarking unit configured to adjust the ON/OFF state of significant bits such that the relation between information defined by N (N is an even number) significant bits $Qnm_j(x, y)$ (x=0, 1, ..., y=0, 1, ...) of the $m_j$-th bit plane of the $n^{th}$ block and a natural number T satisfies either the ON state expressed by equation (3), or the OFF state expressed by equation (4), depending on whether the encoding hash value of the $n^{th}$ block is odd or even, in order to embed a digital watermark, and an encoding unit configured to encode the set of quantized coefficients containing the ON/OFF adjusted significant bits, wherein equation (3) is $$\left| \sum_{k=1}^{\frac{1}{2}N} Qnm_k(ik, jk) \right| - \left| \sum_{k=\frac{1}{2}N+1}^{N} Qnm_k(ik, jk) \right| > T,$$

and wherein equation (4) is $$\left| \sum_{k=\frac{1}{2}N+1}^{N} Qnm_k(ik, jk) \right| - \left| \sum_{k=1}^{\frac{1}{2}N} Qnm_k(ik, jk) \right| > T.$$

3. A code stream producing apparatus comprising:

at least one processor having a quantizer configured to quantize a frequency component obtained from a pixel value of an image through discrete wavelet transform to produce a set of quantized coefficients for each of a plurality of tiles of the image, a block processing unit configured to divide the set of quantized coefficients into a plurality of blocks, a hash conversion unit configured to carry out hash conversion for each of the blocks, based on the quantized coefficients of the block, to obtain an encoding hash value for each of the blocks, a bit plane defining unit configured to divide each of the blocks into a plurality of bit planes, a digital watermarking unit configured to adjust the ON/OFF state of significant bits such that the relation between information defined by N (N is an even number) significant bits $Qn_i m_j(x, y)$ (x=0, 1, ..., y=0, 1, ...) of the $m_j$-th bit plane of the $n_i$-th block and a natural number T satisfies either the ON state expressed by equation (5), or the OFF state expressed by equation (6), depending on whether the encoding hash value of the n1-th block is odd or even, in order to embed a digital watermark, and an encoding unit configured to encode the set of quantized coefficients containing the ON/OFF adjusted significant bits, wherein equation (5) is $$\left|\sum_{k=1}^{\frac{1}{2}N} Qn_k m_k(ik, jk)\right| - \left|\sum_{k=\frac{1}{2}N+1}^{N} Qn_k m_k(ik, jk)\right| > T,$$

and wherein equation (6) is $$\left|\sum_{k=\frac{1}{2}N+1}^{N} Qn_k m_k(ik, jk)\right| - \left|\sum_{k=1}^{\frac{1}{2}N} Qn_k m_k(ik, jk)\right| > T.$$

4. The code stream producing apparatus according to any one of claims 1 through 3,
wherein the digital watermarking unit carries out the ON/OFF adjustment of the significant bits in one of a first mode, in which the relation between the natural number T and the bit information defined by significant bits is adjusted to the ON state when the encoding hash value is odd and to the OFF state when the encoding hash value is even, and a second mode, in which the relation between the natural number T and the bit information defined by significant bits is adjusted to the ON state when the encoding hash value is even and to the OFF state when the encoding hash value is odd.

5. The code stream producing apparatus according to claim 4, further comprising a mode setting unit that selects one of the first and the second modes in a switchable manner, wherein the digital watermarking unit determines the ON/OFF state of the bit information according to the selected mode.

6. The code stream producing apparatus according to claim 5, wherein the mode setting unit selects one of the first and second modes based on the encoding hash value and a coordinate value of a currently processed quantized coefficient on the image.

7. The code stream producing apparatus according to claim 5, wherein the mode setting unit selects one of the first and second modes based on the encoding hash value and externally input secret information.

8. The code stream producing apparatus according to claim 4, wherein the encoding unit performs an encoding operation from a higher bit plane to a lower bit plane, and wherein all the associated bits in bit planes lower than a current bit plane to be processed are made OFF when turning an OFF bit into the ON state, and all the associated bits in the bit planes lower than the current bit plane are made ON when turning an ON bit into the OFF state.

9. The code stream producing apparatus according to claim 4, further comprising a coefficient selecting unit that selects a part of the quantized coefficients, wherein the digital watermarking unit carries out the ON/OFF adjustment of the significant bits for the selected part of the quantized coefficients.

10. The code stream producing apparatus according to claim 9, wherein the coefficient selecting unit selects one of the quantized coefficients that has a difference from an adjacent one of the quantized coefficients equal to or greater than a prescribed threshold value.

11. The code stream producing apparatus according to claim 10, wherein the threshold value is embedded in the quantized coefficients.

12. The code stream producing apparatus according to claim 4, wherein the hash conversion unit carries out the hash conversion using at least one of externally input secret information, date information, and a manufacturing number of the code stream producing apparatus, in addition to the quantized coefficients.

13. An image processing apparatus that receives and decodes a compressed code stream, the apparatus comprising:

at least one processor having
a decoding unit that decodes the code stream to produce a set of quantized coefficients,
a block processing unit that divides the set of quantized coefficients into a plurality of blocks,
a decoding hash conversion unit that carries out hash conversion for each of the blocks, based on the quantized coefficients of the block, to obtain a decoding hash value for the block,
a bit plane defining unit that analyzes the quantized coefficients of each of the blocks into bit planes, and
an unauthorized use detecting unit that determines whether an odd/even property represented by either an ON state, in which a relation between a natural number T and bit information defined by N (N is an even number) significant bits $Qn_i m_j(x,y)$ $(x=0, 1, \ldots, y=0, 1, \ldots)$ of the $m_j$-th bit plane of the $n_i$-th block satisfies equation (7), or an OFF state, in which the relation between the natural number T and the bit information satisfies equation (8), matches an odd or even value of the decoding hash value of the $n_i$-th block to detect unauthorized use, wherein equation (7) is $$\left|\sum_{k=1}^{\frac{1}{2}N} Qn_k m_k(ik, jk)\right| > \left|\sum_{k=\frac{1}{2}N+1}^{N} Qn_k m_k(ik, jk)\right|,$$

and wherein equation (8) is $$\left|\sum_{k=1}^{\frac{1}{2}N} Qn_k m_k(ik, jk)\right| < \left|\sum_{k=\frac{1}{2}N+1}^{N} Qn_k m_k(ik, jk)\right|.$$

14. The image processing apparatus according to claim 13, further comprising an emphasizing display unit that emphasizes the block in which the odd/even property matches the odd/even characteristic of the decoding hash value when displaying a decoded image.

15. A computer readable medium having stored thereon a code stream producing program for causing the computer to execute the method comprising:
dividing an image into a plurality of tiles;
performing discrete wavelet transform on image data of each of the tiles to convert each of pixel values of the image to a frequency component;
quantizing the frequency components to produce a set of quantized coefficients;
dividing the set of quantized coefficients into a plurality of blocks;

performing hash conversion for each of the blocks, based on the quantized coefficients of the block, to obtain an encoding hash value for the block;

dividing each of the blocks into a plurality of planes;

adjusting an ON/OFF state of significant bits such that a relation between information defined by N (N is an even number) significant bits Qnm(x, y) (x=0, 1, . . . , y=0, 1, . . . ) of the m$^{th}$ bit plane of the n$^{th}$ block and a natural number T satisfies either the ON state expressed by equation (1), or the OFF state expressed by equation (2), depending on whether the encoding hash value of the n$^{th}$ block is odd or even, in order to embed a digital watermark; and encoding the set of quantized coefficients containing the ON/OFF adjusted significant bits, wherein equation (1) is $$\left| \sum_{k=1}^{\frac{1}{2}N} Qnm(ik, jk) \right| - \left| \sum_{k=\frac{1}{2}N+1}^{N} Qnm(ik, jk) \right| > T,$$

and wherein equation (2) is $$\left| \sum_{k=\frac{1}{2}N+1}^{N} Qnm(ik, jk) \right| - \left| \sum_{k=1}^{\frac{1}{2}N} Qnm(ik, jk) \right| > T.$$

16. A computer readable medium having stored thereon a code stream producing program for causing the computer to execute the method comprising:

dividing an image into a plurality of tiles;

performing discrete wavelet transform on image data of each of the tiles to convert each of a plurality of pixel values of the image to a frequency component;

quantizing the frequency components to produce a set of quantized coefficients;

dividing the set of quantized coefficients into a plurality of blocks;

performing hash conversion for each of the blocks, based on the quantized coefficients of the block, to obtain an encoding hash value for the block;

dividing each of the blocks into a plurality of bit planes;

adjusting an ON/OFF state of significant bits such that a relation between information defined by N (N is an even number) significant bits Qnm$_j$(x, y) (x=0, 1, . . . , y=0, 1, . . . ) of the m$_j$-th bit plane of the nth block and a natural number T satisfies either the ON state expressed by equation (3), or the OFF state expressed by equation (4), depending on whether the encoding hash value of the n$^{th}$ block is odd or even, in order to embed a digital watermark; and encoding the set of quantized coefficients containing the ON/OFF adjusted significant bits, wherein equation (3) is $$\left| \sum_{k=1}^{\frac{1}{2}N} Qnm_k(ik, jk) \right| - \left| \sum_{k=\frac{1}{2}N+1}^{N} Qnm_k(ik, jk) \right| > T,$$

and wherein equation (4) is $$\left| \sum_{k=\frac{1}{2}N+1}^{N} Qnm_k(ik, jk) \right| - \left| \sum_{k=1}^{\frac{1}{2}N} Qnm_k(ik, jk) \right| > T.$$

17. A computer readable medium having stored thereon a code stream producing program for causing the computer to execute the method comprising:

dividing an image into a plurality of tiles;

performing discrete wavelet transform on image data of each of the tiles to convert each of a plurality of pixel values of the image to a frequency component;

quantizing the frequency components to produce a set of quantized coefficients;

dividing the set of quantized coefficients into a plurality of blocks;

performing hash conversion for each of the blocks, based on the quantized coefficients of the block, to obtain an encoding hash value for the block;

dividing each of the blocks into a plurality of bit planes;

adjusting an ON/OFF state of significant bits such that a relation between information defined by N (N is an even number) significant bits Qn$_i$m$_j$(x, y) (x=0, 1, . . . , y=0, 1, . . . ) of the m$_j$-th bit plane of the n$_i$-th block and a natural number T satisfies either the ON state expressed by equation (5), or the OFF state expressed by equation (6), depending on whether the encoding hash value of the n$_i$-th block is odd or even, in order to embed a digital watermark; and encoding the set of quantized coefficients containing the ON/OFF adjusted significant bits, wherein equation (5) is $$\left| \sum_{k=1}^{\frac{1}{2}N} Qn_k m_k(ik, jk) \right| - \left| \sum_{k=\frac{1}{2}N+1}^{N} Qn_k m_k(ik, jk) \right| > T,$$

and wherein equation (6) is $$\left| \sum_{k=\frac{1}{2}N+1}^{N} Qn_k m_k(ik, jk) \right| - \left| \sum_{k=1}^{\frac{1}{2}N} Qn_k m_k(ik, jk) \right| > T.$$

18. The code stream producing program according to any one of claims 15 through 17, wherein the program causes the computer to carry out the ON/OFF adjustment of the significant bit in one of a first mode, in which the relation between the natural number T and the bit information defined by significant bits is adjusted to the ON state when the encoding hash value is odd and to the OFF state when the encoding hash value is even, and a second mode, in which the relation between the natural number T and the bit information defined by significant bits is adjusted to the ON state when the encoding hash value is even and to the OFF state when the hash value is odd.

19. A computer readable medium having stored thereon an image processing program for causing a computer to execute a method comprising:
- receiving and decoding a compressed code stream to produce a set of quantized coefficients;
- dividing the set of quantized coefficients into a plurality of blocks;
- carrying out hash conversion for each of the blocks, based on the quantized coefficients of the block, to obtain a decoding hash value for the block;
- dividing the quantized coefficients of each of the blocks into a plurality of bit planes; and
- determing whether an odd/even property represented by either an ON state, in which a relation between a natural number T and bit information defined by N (N is an even number) significant bits $Qn_i m_j (x, y)$ ($x=0, 1, \ldots, y=0, 1, \ldots$) of the $m_j$-th bit plane of the $n_i$-th block satisfies equation (7), or an OFF state, in which the relation between the natural number T and the bit information satisfies equation (8), matches an odd or even value of the decoding hash value of the $n_i$-th block to detect unauthorized use, wherein equation (7) is $$\left| \sum_{k=1}^{\frac{1}{2}N} Qn_k m_k(ik, jk) \right| > \left| \sum_{k=\frac{1}{2}N+1}^{N} Qn_k m_k(ik, jk) \right|,$$

and wherein equation (8) is $$\left| \sum_{k=1}^{\frac{1}{2}N} Qn_k m_k(ik, jk) \right| < \left| \sum_{k=\frac{1}{2}N+1}^{N} Qn_k m_k(ik, jk) \right|.$$

20. The computer readable medium according to claim 19, further comprising:
- displaying a decoded image, while emphasizing a block location in which the odd/even property matches the odd/even characteristic of the decoding hash value.

* * * * *